United States Patent
Saito et al.

(10) Patent No.: US 10,899,946 B2
(45) Date of Patent: Jan. 26, 2021

(54) CURABLE RESIN COMPOSITION, POLARIZING FILM AND PRODUCTION PROCESS THEREFOR, OPTICAL FILM, AND IMAGE DISPLAY DEVICE

(71) Applicant: NITTO DENKO CORPORATION, Ibaraki (JP)

(72) Inventors: Takeshi Saito, Ibaraki (JP); Noritsugu Daigaku, Ibaraki (JP); Yasuaki Okada, Ibaraki (JP); Keisuke Kimura, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 171 days.

(21) Appl. No.: 16/072,324

(22) PCT Filed: Jan. 31, 2017

(86) PCT No.: PCT/JP2017/003386
§ 371 (c)(1),
(2) Date: Jul. 24, 2018

(87) PCT Pub. No.: WO2017/154415
PCT Pub. Date: Sep. 14, 2017

(65) Prior Publication Data
US 2019/0031920 A1 Jan. 31, 2019

(30) Foreign Application Priority Data

Mar. 9, 2016 (JP) .................. 2016-045321

(51) Int. Cl.
| | |
|---|---|
| *C08F 2/50* | (2006.01) |
| *C09J 4/00* | (2006.01) |
| *C08L 101/02* | (2006.01) |
| *C08L 43/00* | (2006.01) |
| *C08F 30/06* | (2006.01) |
| *C08L 101/00* | (2006.01) |
| *G02B 1/14* | (2015.01) |
| *C08F 2/44* | (2006.01) |
| *C08F 20/56* | (2006.01) |
| *C08K 5/55* | (2006.01) |
| *C08K 5/56* | (2006.01) |
| *C09J 201/02* | (2006.01) |

(Continued)

(52) U.S. Cl.
CPC .................. *C09J 4/00* (2013.01); *B32B 7/12* (2013.01); *B32B 23/08* (2013.01); *B32B 23/20* (2013.01); *B32B 27/08* (2013.01); *B32B 27/306* (2013.01); *B32B 27/308* (2013.01); *C08F 2/44* (2013.01); *C08F 2/50* (2013.01); *C08F 20/56* (2013.01); *C08F 30/06* (2013.01); *C08K 5/55* (2013.01); *C08K 5/56* (2013.01); *C08L 43/00* (2013.01); *C08L 101/00* (2013.01); *C08L 101/02* (2013.01); *C09J 11/06* (2013.01); *C09J 201/025* (2013.01); *C09J 201/06* (2013.01); *G02B 1/00* (2013.01); *G02B 1/14* (2015.01); *G02B 1/18* (2015.01); *B32B 2255/10* (2013.01); *B32B 2255/26* (2013.01); *B32B 2307/42* (2013.01); *B32B 2457/20* (2013.01); *G02B 5/3025* (2013.01); *G02B 5/3033* (2013.01); *G02F 1/133528* (2013.01)

(58) Field of Classification Search
CPC .......... B32B 7/12; B32B 23/08; B32B 23/20; B32B 27/08; B32B 27/306; B32B 27/308; B32B 2255/10; B32B 2255/26; B32B 2307/42; B32B 2457/20; C08F 30/06; C08F 2/44; C08F 2/50; C08F 20/56; C08K 5/55; C08K 5/56; C08L 101/02; C08L 43/00; C08L 101/00; C09J 4/00; C09J 201/025; C09J 201/06; C09J 11/06; G02B 1/14; G02B 1/18; G02B 5/3025; G02B 1/00; G02B 5/3033; G02F 1/133528
See application file for complete search history.

(56) References Cited

U.S. PATENT DOCUMENTS

| | | | |
|---|---|---|---|
| 2016/0223719 A1 | 8/2016 | Ishiguro | |
| 2018/0052269 A1 | 2/2018 | Saito et al. | |

FOREIGN PATENT DOCUMENTS

| | | | |
|---|---|---|---|
| JP | 2001-296427 A | 10/2001 | |
| JP | 2006-91613 A | 4/2006 | |

(Continued)

OTHER PUBLICATIONS

International Search Report dated Apr. 18, 2017, issued in counterpart application No. PCT/JP2017/003386. (2 pages).

(Continued)

*Primary Examiner* — Patrick D Niland
(74) *Attorney, Agent, or Firm* — Westerman, Hattori, Daniels & Adrian, LLP

(57) ABSTRACT

A curable resin composition, comprising a compound represented by the following general formula (1):

[Formula 1]

$$X-B\begin{smallmatrix}OR^1\\OR^2\end{smallmatrix} \quad (1)$$

wherein X is a functional group comprising a reactive group, and $R^1$ and $R^2$ each independently represent a hydrogen atom, or an aliphatic hydrocarbon group, aryl group or heterocyclic group that may have a substituent; and at least organometallic compound selected from the group consisting of metal alkoxides and metal chelates.

16 Claims, No Drawings

(51) Int. Cl.
*C09J 201/06* (2006.01)
*G02B 1/00* (2006.01)
*C09J 11/06* (2006.01)
*G02B 1/18* (2015.01)
*B32B 7/12* (2006.01)
*B32B 23/08* (2006.01)
*B32B 23/20* (2006.01)
*B32B 27/08* (2006.01)
*B32B 27/30* (2006.01)
*G02B 5/30* (2006.01)
*G02F 1/1335* (2006.01)

(56) References Cited

FOREIGN PATENT DOCUMENTS

| JP | 2006-124639 A | 5/2006 |
| JP | 2006-309120 A | 11/2006 |
| JP | 2012-52000 A | 3/2012 |
| JP | 2013-194082 A | 9/2013 |
| JP | 2015-52710 A | 3/2015 |
| JP | 2015-108099 A | 6/2015 |
| TW | 201531752 A | 8/2015 |
| WO | 2015/053359 A1 | 4/2015 |
| WO | 2016/010031 A1 | 1/2016 |
| WO | 2016/143885 A1 | 9/2016 |
| WO | 2017/199978 A1 | 11/2017 |

OTHER PUBLICATIONS

Office Action dated Jan. 22, 2019, issued in counterpart to JP Application No. 2016-045321, with English translation (5 pages).
Notification of Transmittal of Translation of the International Preliminary Report on Patentability (Form PCT/IB/338) issued in counterpart International Application No. PCT/JP2017/003386 dated Sep. 20, 2018 with Forms PCT/IB/373 and PCT/ISA/237. (7 pages).
Search Report dated Aug. 5, 2020, issued in counterpart TW Application No. 106103782, with English Translation. (2 pages).

CURABLE RESIN COMPOSITION, POLARIZING FILM AND PRODUCTION PROCESS THEREFOR, OPTICAL FILM, AND IMAGE DISPLAY DEVICE

TECHNICAL FIELD

The present invention relates to a curable resin composition; and a polarizing film including a polarizer, and a cured resin layer positioned on at least one surface of the polarizer and yielded by curing the curable resin composition. About the polarizing film, using this film singly or in the form of an optical film in which this film is laminated, an image display device can be formed, examples thereof including a liquid crystal display device (LCD), an organic EL display device, a CRT, and a PDP.

BACKGROUND ART

In watches, portable telephones, PDAs, notebook PCs, monitors for personal computers, DVD players, TVs and others, liquid crystal display devices have been rapidly developing in the market. A liquid crystal display device is a device making the state of polarized light visible by switching of a liquid crystal. In light of the display principle thereof, a polarizer is used. In particular, TVs and other articles have been increasingly required to be higher in brightness and contrast, and wider in viewing angle. Their polarizing film has also been increasingly required to be higher in transmittance, polarization degree, color reproducibility, and others.

As a polarizer, an iodine-based polarizer has been most popularly and widely used, which has a structure obtained by adsorbing iodine onto, for example, a polyvinyl alcohol (hereinafter also referred to merely as a "PVA") and then drawing the resultant. A generally used polarizing film is a polarizing film in which transparent protective films are bonded, respectively, onto both surfaces of a polarizer through the so-called water-based adhesive, in which a polyvinyl alcohol-based material is dissolved in water (Patent Document 1 listed below). For the transparent protective films, for example, triacetylcellulose is used, which has a high water-vapor permeability. In the case of the use of the water-based adhesive (the so-called wet lamination), a drying step is required after the transparent protective films are bonded to the polarizer.

Instead of the water-based adhesive, an active energy ray curable adhesive has been suggested. When the active energy ray curable adhesive is used to produce polarizing films, no drying step is required. Thus, the polarizing films can be improved in producibility. For example, the inventors have suggested a radical-polymerizing type active energy ray curable adhesive, using an N-substituted amide-based monomer as a curable component (Patent Document 2 listed below).

Patent Document 3 listed below describes an ultraviolet curable composition that has been developed to be heightened in adhering strength, particularly, to an acrylic resin film, and that includes a (meth)acrylamide compound (A) having no hydroxyl group, an alkyl (meth)acrylate compound (B) having a hydroxyl group, boric acid (C), and a photopolymerization initiator (D).

PRIOR ART DOCUMENTS

Patent Documents

Patent Document 1: JP-A-2001-296427
Patent Document 2: JP-A-2012-052000
Patent Document 3: JP-A-2013-194082

SUMMARY OF THE INVENTION

Problems to be Solved by the Invention

An adhesive layer formed by using the active energy ray curable adhesive described in Patent Document 2 can sufficiently pass a water resistance test of immersing the adhesive layer into, for example, hot water of 60° C. temperature for 6 hours, and subsequently evaluating whether or not the layer undergoes discoloration or exfoliation. However, in recent years, an adhesive for polarizing films has been required to be further improved in water resistance to such a degree that the resultant adhesive layer can pass a severer water resistance test, for example, in which at the time of immersing this layer in water (or saturating the layer with water) and then peeling off ends of the layer with nails, an evaluation is made as to whether or not the layer undergoes exfoliation. In the actual circumstances, therefore, about the active energy ray curable adhesive described in Patent Document 2 and other adhesives, for polarizing films, that have been reported up to the present time, there remains a room for a further improvement in water resistance.

The technique described in Patent Document 3 is characterized in that boric acid is blended into an ultraviolet curable composition to give this composition an adhering strength onto an acrylic resin film. However, the inventors have made eager investigations to make the following evident: boric acid is low in solubility in the curable resin composition to be poor in dispersibility therein, so that the technique described in Patent Document 3 does not produce a satisfactory advantageous effect. It has been made evident that even when boric acid is blended into a composition, particularly, for a cured resin layer used under a severe high-temperature and high-humidity condition, the composition does not gain an adhesion-improving effect because of a low dispersibility of boric acid.

In light of the actual circumferences, the present invention has been made, and an object thereof is to provide a curable resin composition that can form a cured resin layer good in adhesion to a polarizer, and that is excellent in water resistance even under severer conditions that this layer is in a dew condensation environment or is immersed in water.

It is, particularly, an object of the present invention to provide a polarizing film in which: a cured resin layer is an adhesive layer, and a transparent protective film is laid on/over at least one surface of a polarizer to interpose the adhesive layer therebetween; the adhesion between the polarizer and the transparent protective film is excellent; and the adhesive layer is excellent in water resistance. It is another object to provide an optical film using the polarizing film, and an image display device using the polarizing film or the optical film.

Means for Solving the Problems

The inventors have repeated eager investigations to solve the above-mentioned problems. As a result, the inventors have found out that the objects can be attained by combining a specific boron-based compound with a specific organometallic compound, and blending the combination into a curable resin composition. Thus, the present invention has been solved.

Accordingly, the present invention relates to a curable resin composition, comprising a compound represented by the following general formula (1):

[Formula 1]

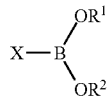

(1)

wherein X is a functional group comprising a reactive group, and $R^1$ and $R^2$ each independently represent a hydrogen atom, or an aliphatic hydrocarbon group, aryl group or heterocyclic group that may have a substituent; and at least organometallic compound selected from the group consisting of metal alkoxides and metal chelates.

It is preferred in the curable resin composition that the compound represented by the general formula (1) is a compound represented by the following general formula (1'):

[Formula 2]

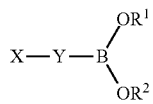

(1')

wherein Y is an organic group, and X, $R^1$ and $R^2$ are the same as described above.

It is preferred that the curable resin composition further comprises an active energy ray curable component; and the functional group that the compound represented by the general formula (1) comprises is at least one reactive group selected from the group consisting of vinyl, (meth)acryl, styryl, (meth)acrylamide, epoxy, oxetane, and mercapto groups.

It is preferred in the curable resin composition that the metal in the organometallic compound is titanium.

It is preferred that the curable resin composition comprises, as the organometallic compound, one of the metal alkoxides; and an organic group which the metal alkoxide has six or more carbon atoms.

It is preferred that the curable resin composition comprises, as the organometallic compound, one of the metal chelates; and an organic group which the metal chelate has four or more carbon atoms.

It is preferred in the curable resin composition that when a cured product yielded by curing the curable resin composition is immersed in pure water of 23° C. temperature for 24 hours, the cured product shows a bulk water absorption coefficient of 10% or less by weight, the bulk water absorption coefficient being represented by the following expression:

$$\{(M2-M1)/M1\} \times 100 (\%)$$

wherein M1: a weight of the cured product before the product is immersed, and M2: a weight of the cured product after the product is immersed.

It is preferred in the curable resin composition that the cured product yielded by curing the curable resin composition shows a storage modulus of $1.0 \times 10^7$ Pa or more at 25° C.

It is preferred in the curable resin composition that $R^1$ and $R^2$, which the compound represented by the general formula (1) has, are each a hydrogen atom.

It is preferred that the curable resin composition comprises a compound represented by the following general formula (2):

[Formula 3]

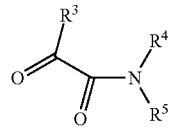

(2)

wherein $R^3$ is a hydrogen atom or a methyl group, $R^4$ and $R^5$ are each independently a hydrogen atom, an alkyl group, a hydroxyalkyl group, an alkoxyalkyl group or a cyclic ether group, and $R^4$ and $R^5$ may form a cyclic hetero-ring.

The present invention also relates to a polarizing film, comprising a polarizer, and a cured resin layer positioned on/over at least one surface of the polarizer and yielded by curing a curable resin composition,
wherein the curable resin composition is a curable resin composition as recited in any one of the paragraphs concerned.

It is preferred in the polarizing film that the cured resin layer is an adhesive layer, and a transparent protective film is laid over at least one surface of the polarizer to interpose the adhesive layer between the polarizer and the transparent protective film.

It is preferred in the polarizing film that the transparent protective film has a water-vapor permeability of 5 to 70 g/m².

The present invention also relates to an optical film wherein at least one polarizing film as recited in any one of the paragraphs concerned is laminated, or an image display device making use of a polarizing film as recited in any one of the paragraphs concerned, or an optical film as recited in the paragraph concerned.

The present invention further relates to a production process for a polarizing film comprising a polarizer, and a cured resin layer positioned on/over at least one surface of the polarizer and yielded by curing a curable resin composition;

the curable resin composition being a composition comprising a compound represented by the following general formula (1):

[Formula 4]

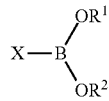

(1)

wherein X is a functional group comprising a reactive group, and $R^1$ and $R^2$ each independently represent a hydrogen atom, or an aliphatic hydrocarbon group, aryl group or heterocyclic group that may have a substituent, and at least organometallic compound selected from the group consisting of metal alkoxides and metal chelates; and the process comprising an applying step of applying the curable resin composition to at least one surface of the polarizer, and a curing step of radiating an active energy ray to the resultant workpiece from a surface side of the workpiece on/over which the polarizer is present, or a surface side thereof on/over which the curable resin composition is applied, to cure the curable resin composition.

Effect of the Invention

After cured, the curable resin composition according to the present invention may be exposed to a dew condensation environment in various composition-applied articles thereof. Giving a polarizing film as an example, a description will be made. When a polarizing film in which a cured resin layer is laminated on a polarizer is exposed to a dew condensation environment, a mechanism that adhesion peeling is generated between the cured resin layer and the polarizer can be presumed as follows: Water diffuses initially into the cured resin layer, and then the water diffuses to the polarizer interfacial side of the layer. In any conventional polarizing film, hydrogen bonding and/or ion bonding contribute(s) largely to adhering strength between its cured resin layer and polarizer; however, the water that has diffused to the polarizer interfacial side causes dissociation of the hydrogen bonding and the ion bonding in the interface. As a result, the adhering strength between the cured resin layer and the polarizer is lowered. This lowering may cause a delamination between the cured resin layer and the polarizer in a dew condensation environment.

In the meantime, the curable resin composition according to the present invention has a compound having a boric acid group and/or a borate group (compound represented by the above-mentioned general formula (1)). The boric acid group and/or the borate group is/are easily combined with hydroxyl groups which, in particular, a polyvinyl alcohol-based polarizer has, so as to form ester bonds. Moreover, the compound represented by the general formula (1) further has X comprising a reactive group, and reacts through the reactive group, which X has, with some other curable component comprised in the curable resin composition. In other words, the boric acid group and/or the borate group, which the cured resin layer has, is/are strongly bonded to the hydroxyl groups, which the polarizer has, through covalent bonding. In this way, even when water is present in the interface between the polarizer and the cured resin layer, these interact strongly with each other not only through the hydrogen bonding and/or ion bonding but also through the covalent bonding, so that the polarizer and the cured resin layer are abruptly improved in adhesion water-resistance therebetween.

In order that the compound having a boric acid group and/or a borate group can produce the above-mentioned advantageous effect, it is necessary that the compound is blended in a sufficient amount into the composition, and is further good in dispersibility in the composition. The curable resin composition according to the present invention comprises, together with the compound having a boric acid group and/or a borate group, at least one organometallic compound selected from the group consisting of metal alkoxides and metal chelates. When the organometallic compound is present, the compound having a boric acid group and/or a borate group is heightened in dispersibility in the composition, and further in a cured resin layer yielded by curing the composition. As a result, the compound having a boric acid group and/or a borate group can sufficiently produce the above-mentioned advantageous effect, so that between the polarizer and the cured resin layer, adhesion water-resistance is abruptly improved.

Furthermore, when the metal compound is blended into the curable resin composition, the metal compound itself can also give adhesion water-resistance to the cured resin layer after the composition is cured. The reason why such an advantageous effect is gained can be presumed as follows: At least one organometallic compound selected from the group consisting of metal alkoxides and metal chelates is turned to an active metal species by the intervention of water, so that the organometallic compound interacts intensely with both of the polarizer, and the active energy ray curable component comprised in the adhesive layer. In this way, an abrupt improvement is made in adhesion water-resistance between the polarizer and the adhesive layer even when water is present in the interface between the polarizer and the adhesive layer. This is because these members interact intensely with each other through the organometallic compound.

As described above, the curable resin composition according to the present invention comprises at least one organometallic compound selected from the group consisting of metal alkoxides and metal chelates together with a compound having a boric acid group and/or a borate group to produce a synergetic effect of (i) an adhesion water-resistance improving effect onto a cured resin layer yielded through/after the curing of the composition, this effect being based on the compound having a boric acid group and/or a borate group, and (ii) an adhesion water-resistance improving effect onto the cured resin layer yielded through/after the curing, this effect being based on the organometallic compound; and further to produce (iii) an effect of heightening the adhesion water-resistance improving effects further, this heightening-effect being caused by the organometallic compound and resulting from an effect of improving the dispersibility of the compound having a boric acid group and/or a borate group. By the combination of these effects with each other, the cured resin layer, which is yielded from the curable resin composition according to the present invention, shows an unprecedented adhesion water-resistance.

When the compound represented by the general formula (1) includes a reactive group through its organic group bonded to its boric acid atom, a cured resin layer yielded by curing the curable resin composition having this compound is remarkably improved in adhesion water-resistance between the layer and the polarizer. A reason therefor can be presumed as follows: As described above, in the compound represented by the general formula (1), its boric acid group and/or borate group react(s) with hydroxyl groups which a polyvinyl-based polarizer has, so that these groups are strongly bonded to each other. However, unless the reactive group which the compound represented by the general formula (1) has reacts with any other curable component comprised in the curable resin composition, in the end a sufficient improvement is not made in adhesion water-resistance between the polarizer and the cured resin layer. In this case, the boric acid group and/or borate group, which the compound represented by the general formula (1) has, and further the polarizer and others show hydrophilicity; thus, affinity is not very high between the compound represented by the general formula (1) and the other curable component comprised in the curable resin composition. However, when the compound represented by the general formula (1) contains a reactive group to interpose, therebetween, its organic group bonded to its boric acid atom (the case of the general formula (1')), the organic group shows affinity with the other curable component, so that the reactive group which the compound represented by the general formula (1) has, this reactive group having reacted with the polarizer and others, reacts very effectively with the other curable component. Consequently, the polarizer and the cured resin layer are very abruptly improved in adhesion water-resin therebetween.

As the compound having a boric acid group and/or a borate group and having a reactive group, there is a compound containing a reactive group to interpose, therebetween, an oxygen atom bonded to a boron atom (hereinafter referred to also as a "B—O bond containing compound"). However, this compound is largely different in adhesion water-resistance improvement-degree from the compound containing a reactive group to interpose, therebetween, an organic group bonded to a boric acid atom (hereinafter referred to also as a "B—C bond containing compound") when each of these compounds is incorporated into the curable resin composition. Reasons therefor would the following (i) and (ii): (i) in a dew condensation environment, the boron-oxygen bond in the B—O bond containing compound is easily hydrolyzed so that a resin layer formed through/after the curing of the composition is deteriorated in adhesion water-resistance. (ii) The boron-carbon bond in the B—C bond containing compound is excellent in hydrolysis resistance even in a dew condensation environment. As a result, the resin layer formed through/after the curing of the composition is very abruptly improved in adhesion water-resistance.

Furthermore, about a polarizing film in which a cured resin layer formed using the above-defined curable resin composition is an adhesive layer, and a transparent protective film is laid on/over at least one surface of a polarizer to interpose the adhesive layer therebetween, the optical endurance thereof (in a humidification endurance test) is good in a severe humidifying environment (for example, at 85° C. and 85% RH). For this reason, even when the polarizing film of the present invention is put into the severe humidifying environment, a fall (change) of the polarizing film in transmittance and polarization can be restrained into a small degree. Moreover, even when the polarizing film of the present invention is exposed to a severe environment, such as immersion in water, the film can be restrained from being lowered in adhering strength. Thus, also under a severe contact environment between the film and water, between the polarizer and the transparent protective film (between the polarizer and the adhesive layer) a lowering in adhering strength can be restrained into a small degree.

MODE FOR CARRYING OUT THE INVENTION

<Compound Represented by General Formula (1)>

The curable resin composition according to the present invention includes a compound represented by the following general formula (1):

[Formula 5]

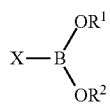
(1)

wherein X is a functional group including a reactive group, and $R^1$ and $R^2$ each independently represent a hydrogen atom, or an aliphatic hydrocarbon group, aryl group or heterocyclic group that may have a substituent. The aliphatic hydrocarbon group may be a linear or branched alkyl group that has 1 to 20 carbon atoms and may have a substituent, a cyclic alkyl group that has 3 to 20 carbon atoms and may have a substituent, or an alkenyl group that has 2 to 20 carbon atoms. The aryl group may be a phenyl group that has 6 to 20 carbon atoms and may have a substituent, or a naphthyl group that has 10 to 20 carbon atoms and may have a substituent. The heterocyclic group is, for example, a five- or six-membered cyclic group that contains at least one heteroatom and may have a substituent. These may be linked to each other to form a ring. In the general formula (1), $R^1$ and $R^2$ are each preferably a hydrogen atom, or a linear or branched alkyl group that has 1 to 3 carbon atoms, most preferably a hydrogen atom.

X which the compound represented by the general formula (1) has is a functional group including a reactive group, and is a functional group that can react with a different curable component included in the curable resin composition. Examples of the reactive group including X include hydroxyl, amino, aldehyde, carboxyl, vinyl, (meth)acryl, styryl, (meth)acrylamide, vinyl ether, epoxy and oxetane groups. When the curable resin composition used in the present invention is active energy ray curable, the reactive group including X is preferably at least one reactive group selected from the group consisting of vinyl, (meth)acryl, styryl, (meth)acrylamide, vinyl ether, epoxy, oxetane, and mercapto groups. When the curable resin composition is, particularly, radical polymerizable, the reactive group including X is preferably at least one reactive group selected from the group consisting of (meth)acryl, styryl, and (meth) acrylamide groups. When the compound represented by the general formula (1) has a (meth)acrylamide group, this compound is high in reactivity to be heightened in copolymerization rate with the active energy ray curable resin composition; thus, this case is more preferred. The case is preferred also in that the (meth)acrylamide group is high in polarity so that the composition is excellent in adhesion to gain the advantageous effects of the present invention effectively. When the curable resin composition used in the present invention is cationically polymerizable, the reactive group including X preferably has at least one functional group selected from the group consisting of hydroxyl, amino, aldehyde, carboxyl, vinyl ether, epoxy, oxetane, and mercapto groups. When the reactive group has, particularly, an epoxy group, adhesion is favorably excellent between the resultant cured resin layer and an adherend. When the reactive group has a vinyl ether group, the curable resin composition is favorably excellent in curability.

A preferred and specific example of the compound represented by the general formula (1) is a compound represented by the following general formula (1'):

[Formula 6]

wherein Y is an organic group, and X, $R^1$ and $R^2$ are the same as described above. More preferred examples thereof include the following compounds (1a) to (1d):

[Formula 7]

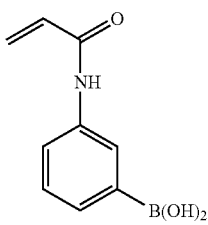
(1a)

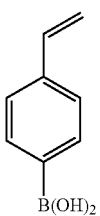
(1b)

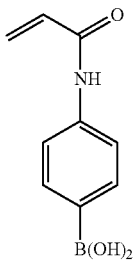
(1c)

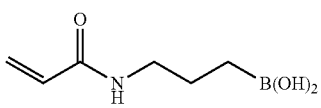
(1d)

In the present invention, the compound represented by the general formula (1) may be a compound in which a reactive group is directly bonded to a boron atom. As demonstrated about the above-mentioned specific examples, it is preferred that the compound represented by the general formula (1) is a compound in which a reactive group is bonded to the boron atom through an organic group, that is, this compound is a compound represented by the general formula (1'). When the compound represented by the general formula (1) is, for example, a compound in which a reactive group is bonded to a boron atom through an oxygen atom, an adhesive layer yielded by curing the curable resin composition containing this compound tends to be deteriorated in adhesion water-resistance. In the meantime, when the compound represented by the general formula (1) is not a compound having no boron-oxygen bond, but a compound in which a boron atom is bonded to an organic group so that the compound contains a reactive group while this compound has a boron-carbon bond (the case of the general formula (1')), the composition is favorably improved in adhesion water-resistance. The organic group specifically means an organic group that has 1 to 20 carbon atoms and may have a substituent. More specific examples thereof include any linear or branched alkylene group that has 1 to 20 carbon atoms and may have a substituent, any cyclic alkylene group that has 3 to 20 carbon atoms and may have a substituent, and any phenylene group that has 6 to 20 carbon atoms and may have a substituent, and any naphthylene group that has 10 to 20 carbon atoms and may have a substituent.

Examples of the compound represented by the general formula (1) include, besides the compounds given as the above-mentioned examples, an ester made from hydroxyethylacrylamide and boric acid, an eater made from methylolacylamide and boric acid, an ester made from hydroxyethyl acrylate and boric acid, an ester made from hydroxylbutyl acrylate and boric acid, and other esters each made from a (meth)acrylate and boric acid.

In order to improve adhesion between a polarizer and the cured resin layer, and the water resistance of the layer, in particular, in order that when a polarizer and a transparent protective film are bonded to each other through the adhesive layer, adhesion therebetween and the water resistance may be improved, the content of the compound represented by the general formula (1) in the curable resin composition is preferably from 0.001 to 50% by weight, more preferably from 0.1 to 30% by weight, most preferably from 1 to 10% by weight.

<Organometallic Compound>

The curable resin composition according to the present invention includes, besides the compound represented by the general formula (1), at least one organometallic compound selected from the group consisting of metal alkoxides and metal chelates. The metal alkoxides are each a compound in which at least one alkoxy group, which is an organic group, is bonded to a metal. The metal chelates are each a compound in which an organic group is bonded or coordinated to a metal to interpose an oxygen atom therebetween. The metal is preferably titanium, aluminum, or zirconium. Aluminum and zirconium, out of these metals, are higher in reactivity than titanium so that the two metals may make the pot life of the adhesive composition shorter than titanium, and further the two metals may produce a lower effect of improving the adhesion water-resistance. Thus, from the viewpoint of an improvement of the adhesive layer in adhesion water-resistance, the metal of the organometallic compound is more preferably titanium.

When the curable resin composition according to the present invention includes a metal alkoxide as the organometallic compound, it is preferred to use a metal alkoxide having an organic group having 4 or more carbon atoms. More preferably, the organic group has 6 or more carbon atoms. If the number of carbon atoms in the group is 3 or less, the curable resin composition may be shortened in pot life, and may be further lowered in adhesion water-resistance improving effect. The organic group having 6 or more carbon atoms is, for example, an octoxy group, and is favorably usable. Suitable examples of the metal alkoxide include tetraisopropyl titanate, tetra-n-butyl titanate, butyl titanate dimer, tetraoctyl titanate, tert-amyl titanate, tetra-tert-butyl titanate, tetrastearyl titanate, zirconium tetraisopropoxide, zirconium tetra-n-butoxide, zirconium tetraoctoxide, zirconium tetra-tert-butoxide, zirconium tetrapropoxide, aluminum sec-butylate, aluminum ethylate, aluminum isopropylate, aluminum butylate, aluminum diisopropylate mono-sec-butyrate, and mono-sec-butoxy-aluminum diisopropylate. Out of these examples, tetraoctyl titanate is preferred.

When the curable resin composition according to the present invention contains a metal chelate as the organometallic compound, it is preferred that the composition contains a metal chelate having an organic group having 4 or more carbon atoms. If the number of carbon atoms in the group is 3 or less, the curable resin composition may be shortened in pot life, and may be further lowered in adhesion water-resistance improving effect. Examples of the organic group having 4 or more carbon atoms include an acetylacetonate group, an ethylacetoacetate group, an isostearate group, and an octyleneglycolate group. Out of the groups, acetylacetonate and ethylacetoacetate groups are preferred from the viewpoint of improving the adhesive layer in adhesion water-resistance. Preferred examples of the metal chelate include titanium acetylacetonate, titanium octyleneglycolate, titanium tetraacetylacetonate, titanium ethylacetoacetate, polyhydroxytitanium stearate, dipropoxy-bis(acetylacetonato) titanium, dibutoxytitanium-bis(octylene glycolate), dipropoxytitanium-bis(ethylacetoacetate), titanium lactate, titanium diethanolaminate, titanium triethanolaminate, dipropoxytitanium-bis(lactate), dipropoxytitanium-bis(triethanolaminate), di-n-butoxytitanium-bis(triethanolaminate), tri-n-butoxytitanium monostearate, diisopropoxy.bis(ethylacetoacetate) titanium, diisopropoxy.bis(acetylacetate) titanium, diisopropoxy.bis(acetylacetone) titanium, titanium phosphate compounds, an ammonium salt of titanium lactate, titanium-1,3-propanedioxybis(ethylacetoacetate), a titanium dodecylbenzenesulfonate compound, titanium aminoethylaminoethanolate, zirconium tetraacetylacetonate, zirconium monoacetylacetonate, zirconium bisacetylacetonate, zirconium acetylacetonate bisethylacetoacetate, zirconium acetate, tri-n-butoxyethylacetoacetate zirconium, di-n-butoxybis(ethylacetoacetate) zirconium, n-butoxytris(ethylacetoacetate) zirconium, tetrakis(n-propylacetoacetate) zirconium, tetrakis(acetylacetoacetate) zirconium, tetrakis(ethylacetoacetate) zirconium, aluminum ethylacetoacetate, aluminum acetylacetonate, aluminum acetylacetonate bisethylacetoacetate, diisopropoxyethylacetoacetate aluminum, diisopropoxyacetylacetonate aluminum, isopropoxybis(ethylacetoacetate) aluminum, isopropoxybis(acetylacetonate) aluminum, tris(ethylacetoacetate) aluminum, tris(acetylacetonate) aluminum, mono-acetylacetonate.bis(ethylacetoacetate) aluminum. Out of the examples, titanium acetylacetonate and titanium ethylacetoacetate are preferred.

Examples of the organometallic compound that is usable in the present invention and is other than the above-mentioned organometallic compounds include zinc octylate, zinc laurate, zinc stearate, tin octylate, and other organic carboxylic acid metal salts; and acetylacetone zinc chelate, benzoylacetone zinc chelate, dibenzoylmethane zinc chelate, ethyl acetoacetate zinc chelate, and other zinc chelate compounds.

About the the proportion of the included organometallic compound in the present invention, the amount thereof is preferably from 0.05 to 9 parts, preferably from 0.1 to 8 parts, more preferably from 0.15 to 5 parts by weight for 100 parts by weight of the active energy ray curable component. If the blend amount is more than 9 parts by weight, the adhesive composition may be deteriorated in storage stability, or the proportion of the components that are to be bonded to a polarizer or a protective film may be relatively insufficient, so that the composition may be unfavorably lowered in adhesion. If the amount is less than 0.05 part by weight, the composition does not sufficiently exhibit the advantageous effect of adhesion water-resistance.

<Different Curable Component>

A cured resin layer in the present invention is formed by curing the curable resin composition, which includes at least the compound represented by the general formula (1) and the organometallic compound and further includes a different curable component. Manners for curing the curable resin composition can be roughly classified to thermal curing, and active energy ray curing. Examples of a thermosetting resin therefor include polyvinyl alcohol resin, epoxy resin, unsaturated polyester, urethane resin, acrylic resin, urea resin, melamine resin, and phenol resin. As the need arises, together with the resin, a curing agent is used. The thermosetting resin is more preferably polyvinyl alcohol resin or epoxy resin. Resins for the active energy ray curing can be roughly classified into the following types in accordance with a classification-based on the active energy ray thereof: electron beam curable, ultraviolet curable, and visible ray curable types. Curable resin compositions of the present invention can be divided into radical polymerizable resin compositions and cationically polymerizable resin compositions in accordance with the form of the curing thereof. In the present invention, any active energy ray having a wavelength in a range of 10 nm or more and less than 380 nm is described as an ultraviolet ray; and any active energy ray having a wavelength in a range from 380 to 800 nm, as a visible ray.

As described above, in the production of the polarizing film according to the present invention, the curable resin composition preferably has active energy ray curability. Furthermore, the composition in particular preferably has visible ray curability, which makes use of visible rays each having a wavelength of 380 to 450 nm.

<1: Radical Polymerization Curable Resin Composition>

The curable component different from the compound represented by the general formula (1) is, for example, a radical polymerizable compound used in a radical polymerization curable resin composition. Examples of the radical polymerizable compound include compounds each having a radical polymerizable functional group of a carbon-carbon double bond, such as a (meth)acryloyl group or a vinyl group. These curable components may be either monofunctional radical polymerizable compounds, or bifunctional or higher polyfunctional radical polymerizable compounds. These radical polymerizable compounds may be used alone or in any combination of two or more thereof. These radical polymerizable compounds are preferably, for example, compounds each having a (meth)acryloyl group. In the present invention, the word "(meth)acryloyl" means an acryloyl group and/or a methacryloyl group. The notation "(meth)a" has substantially the same meaning.

<<Monofunctional Radical Polymerizable Compound>>

The monofunctional radical polymerizable compound is, for example, a compound represented by the following general formula (2):

[Formula 8]

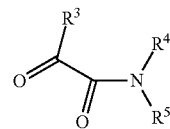

(2)

wherein $R^3$ is a hydrogen atom or a methyl group; and $R^4$ and $R^5$ are each independently a hydrogen atom, an alkyl group, a hydroxyalkyl group, an alkoxyalkyl group or a cyclic ether group, and $R^4$ and $R^5$ may form a cyclic heteroring. The number of carbon atoms in the alkyl moiety of (each of) the alkyl group, hydroxyalkyl group and/or alkoxyalkyl group is not particularly limited, and is, for example, from 1 to 4. The cyclic hetero-ring, which $R^4$ and $R^5$ may form, is, for example, N-acryloylmorpholine. In the present invention, a compound satisfying both of the structure represented by the general formula (1) and that represented by the general formula (2) is referred to as a compound represented by the general formula (1).

Specific examples of the compound represented by the general formula (2) include N-methyl(meth)acrylamide, N,N-dimethyl(meth)acrylamide, N,N-diethyl(meth)acrylamide, N-isopropyl(meth)acrylamide, N-butyl(meth)acrylamide, N-hexyl(meth)acrylamide, and other N-alkyl-group-containing acrylamide derivatives; N-methylol(meth)acrylamide, N-hydroxyethyl(meth)acrylamide, N-methylol-N-propane(meth)acrylamide, and other N-hydroxyalkyl-group-containing (meth)acrylamide derivatives; and N-methoxymethylacrylamide, N-ethoxymethylacrylamide, and other N-alkoxy-group-containing (meth)acrylamide derivatives. An example of the compound as a cyclic-ether-group-containing (meth)acrylamide derivative is a hetero-ring-containing (meth)acrylamide derivative in which a nitrogen atom of a(meth)acrylamide group is included in a hetero-ring. Examples thereof include N-acryloylmorpholine, N-acryloylpiperidine, N-methacryloylpiperidine, and N-acryloylpyrrolidine. Out of these examples, N-hydroxyethylacrylamide, and N-acryloylmorpholine can be preferably used since these compounds are excellent in reactivity and give a cured product of a high elastic modulus, and the resultant adhesive layer is excellent in adhesion to polarizers.

In order to improve adhesion between a polarizer and the cured resin layer, and the water resistance of the layer, in particular, in order that when a polarizer and a transparent protective film are bonded to each other through the adhesive layer, adhesion therebetween and the water resistance can be improved, the content of the compound represented by the general formula (2) in the curable resin composition is preferably from 0.01 to 80%, more preferably from 5 to 40% by weight of the composition.

The curable resin composition used in the present invention may include, as a curable component, a monofunctional radical polymerizable compound other than the compound represented by the general formula (2). Examples of the monofunctional radical polymerizable compound include various (meth)acrylic acid derivatives each having a (meth) acryloyloxy group. Specific examples thereof include methyl (meth)acrylate, ethyl (meth)acrylate, n-propyl (meth)acrylate, isopropyl (meth)acrylate, 2-methyl-2-nitropropyl (meth)acrylate, n-butyl (meth)acrylate, isobutyl (meth)acrylate, s-butyl (meth)acrylate, t-butyl (meth)acrylate, n-pentyl (meth)acrylate, t-pentyl (meth)acrylate, 3-pentyl (meth)acrylate, 2,2-dimethylbutyl (meth)acrylate, n-hexyl (meth)acrylate, cetyl (meth)acrylate, n-octyl (meth)acrylate, 2-ethylhexyl (meth)acrylate, 4-methyl-2-propylpentyl (meth)acrylate, n-octadecyl (meth)acrylate, and other ($C_1$ to $C_{20}$) alkyl esters of (meth)acrylic acid.

Examples of the above-mentioned (meth)acrylic acid derivatives include cyclohexyl (meth)acrylate, cyclopentyl (meth)acrylate, and other cycloalkyl (meth)acrylates; benzyl (meth)acrylate, and other aralkyl (meth)acrylates; 2-isobornyl (meth)acrylate, 2-norbornylmethyl (meth)acrylate, 5-norbornene-2-yl-methyl (meth)acrylate, 3-methyl-2-norbornylmethyl (meth)acrylate, dicyclopentenyl (meth)acrylate, dicyclopentenyloxyethyl (meth)acrylate, dicyclopentanyl (meth)acrylate, and other polycyclic (meth)acrylates; 2-methoxyethyl (meth)acrylate, 2-ethoxyethylethyl (meth) acrylate, 2-methoxymethoxyethyl (meth)acrylate, 3-methoxybutyl (meth)acrylate, ethylcarbitol (meth)acrylate, phenoxyethyl (meth)acrylate, alkylphenoxy polyethylene glycol (meth)acrylate, and other alkoxy-group- or phenoxy-group-containing (meth)acrylates. Out of these examples, dicyclopentenyloxyethyl acrylate, and phenoxyethyl acrylate are preferred from the viewpoint of the adhesion of the curable resin composition to various protective films.

Other examples of the above-mentioned (meth)acrylic acid derivatives include 2-hydroxyethyl (meth)acrylate, 2-hydroxypropyl (meth)acrylate, 3-hydroxypropyl (meth) acrylate, 2-hydroxybutyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate and other hydroxyalkyl (meth)acrylates; [4-(hydroxymethyl)cyclohexyl]methyl acrylate, cyclohexanedimethanol mono(meth)acrylate, 2-hydroxy-3-phenoxypropyl (meth)acrylate, and other hydroxyl-group-containing (meth)acrylates; glycidyl (meth) acrylate, 4-hydroxybutyl (meth)acrylate glycidyl ether, and other epoxy-group-containing (meth)acrylates; 2,2,2-trifluoroethyl (meth)acrylate, 2,2,2-trifluoroethylethyl (meth)acrylate, tetrafluoropropyl (meth)acrylate, hexafluoropropyl (meth)acrylate, octafluoropentyl (meth)acrylate, heptadecafluorodecyl (meth)acrylate, 3-chloro-2-hydroxypropyl (meth)acrylate, and other halogen-containing (meth)acrylates; dimethylaminoethyl (meth)acrylate, and other alkylaminoalkyl (meth)acrylates; 3-oxetanylmethyl (meth)acrylate, 3-methyl-oxetanylmethyl (meth)acrylate, 3-ethyl-oxetanylmethyl (meth)acrylate, 3-butyl-oxetanylmethyl (meth)acrylate, 3-hexyl-oxetanylmethyl (meth)acrylate, and other oxetane-group-containing (meth)acrylate; tetrahydrofurfuryl (meth)acrylate, butyrolactone (meth)acrylate, and other (meth)acrylates each having a hetero-ring; and neopentyl hydroxypivalate glycol (meth)acrylic acid adduct, and p-phenylphenol (meth)acrylate. Out of these examples, 2-hydroxy-3-phenoxypropyl acrylate is preferred because of an excellent adhesion of the curable resin composition to various protective films.

Other examples of the monofunctional radical polymerizable compound include (meth)acrylic acid, carboxyethyl acrylate, carboxypentyl acrylate, itaconic acid, maleic acid, fumaric acid, crotonic acid, isocrotonic acid, and other carboxyl-group-containing monomers.

Additional examples of the monofunctional radical polymerizable compound include N-vinylpyrrolidone, N-vinyl-ε-caprolactam, methylvinylpyrrolidone, and other lactam-based vinyl monomers; and vinylpyridine, vinylpiperidone, vinylpyrimidine, vinylpiperazine, vinylpyrazine, vinylpyrrole, vinylimidazole, vinyloxazole, vinylmorpholine, and other vinyl-based monomers each having a nitrogen-containing hetero-ring.

In the case of incorporating, into the curable resin composition used in the present invention, for example, a hydroxyl-group-containing (meth)acrylate, carboxyl-group-containing (meth)acrylate or phosphoric-acid-group-containing (meth)acrylate, which has a high polarity, the composition is improved in adhering strength to various substrates. The content of the hydroxyl-group-containing (meth)acrylate is preferably from 1 to 30% by weight of the resin composition. If the content is too large, the resultant cured product may be heightened in water absorption coefficient to be deteriorated in water resistance. The content of the carboxyl-group-containing (meth)acrylate is preferably from 1 to 20% by weight of the resin composition. If the content is too large, the resultant polarizing film is unfavorably lowered in optical endurance. The phosphoric-acid-group-containing (meth)acrylate is, for example, 2-(meth) acryloyloxyethyl acid phosphate. The content is preferably from 0.1 to 10% by weight of the resin composition. If the content is too large, the resultant polarizing film is unfavorably lowered in optical endurance.

The monofunctional radical polymerizable compound may be a radical polymerizable compound having an active methylene group. The radical polymerizable compound having an active methylene group is a compound having, at a terminal thereof or in the molecule thereof, an active double bond group such as a (meth)acryl group, and further having an active methylene group. Examples of the active methylene group include acetoacetyl, alkoxymalonyl, and cyanoacetyl groups. The active methylene group is preferably an acetoacetyl group. Specific examples of the radical polymerizable compound having an active methylene group include 2-acetoacetoxyethyl (meth)acrylate, 2-acetoacetoxypropyl (meth)acrylate, 2-acetoacetoxy-1-methylethyl (meth)acrylate, and other acetoacetoxyalkyl (meth)acrylates; 2-ethoxymalonyloxyethyl (meth)acrylate, 2-cyanoacetoxyethyl (meth)acrylate, N-(2-cyanoacetoxyethyl)acrylamide, N-(2-propionylacetoxybutyl)acrylamide, N-(4-acetoacetoxymethylbenzyl)acrylamide, and N-(2-acetoacetylaminoethyl)acrylamide. The radical polymerizable compound having an active methylene group is preferably an acetoacetoxyalkyl (meth)acrylate.

<<Polyfunctional Radical Polymerizable Compound>>

Examples of the bifunctional or higher polyfunctional radical polymerizable compound include N,N'-methylenebis (meth)acrylamide, which is a polyfunctional (meth)acrylamide derivative, tripropylene glycol di(meth)acrylate, tetraethylene glycol di(meth)acrylate, 1,6-hexanediol di(meth) acrylate, 1,9-nonanediol di(meth)acrylate, 1,10-decanediol diacrylate, 2-ethyl-2-butylpropanediol di(meth)acrylate, bisphenol A di(meth)acrylate, bisphenol A ethylene oxide adduct di(meth)acrylate, bisphenol A propylene oxide adduct di(meth)acrylate, bisphenol A diglycidyl ether di(meth)acrylate, neopentyl glycol di(meth)acrylate, tricyclodecanedimethanol di(meth)acrylate, cyclic trimethylolpropaneformal (meth)acrylate, dioxane glycol di(meth)acrylate, trimethylolpropane tri(meth)acrylate, pentaerythritol tri (meth)acrylate, pentaerythritol tetra(meth)acrylate, dipentaerythritol penta(meth)acrylate, dipentaerythritol hexa(meth)acrylate, EO-modified diglycerin tetra(meth)acrylate, and other esterified products each made from (meth)acrylic acid and a polyhydric alcohol, and 9,9-bis[4-(2-(meth)acryloyloxyethoxy)phenyl]fluorene Preferred and specific examples thereof include ARONIX M-220 (manufactured by Toagosei Co., Ltd.), LIGHT ACRYLATE 1,9 ND-A (manufactured by Kyoeisha Chemical Co., Ltd.), LIGHT ACRYLATE DGE-4A (manufactured by Kyoeisha Chemical Co., Ltd.), LIGHT ACRYLATE DCP-A (manufactured by Kyoeisha Chemical Company, Ltd.), SR-531 (manufactured by a company Sartomer), and CD-536 (manufactured by the company Sartomer). As the need arises, for example, the following are used: various epoxy (meth)acrylates, urethane (meth)acrylates and polyester (meth)acrylates; and various (meth)acrylate monomers. A polyfunctional (meth) acrylamide derivative is preferably incorporated into the curable resin composition since the derivative gives a large polymerization rate to give an excellent producing performance, and further at the time of making the resin composition into a cured product the derivative gives an excellent crosslinking performance.

About such radical polymerizable compounds, it is preferred from the viewpoint of making the composition compatible between adhesion to a polarizer and various transparent protective films, and optical endurance in a severe environment to use a monofunctional radical polymerizable compound and a polyfunctional radical polymerizable compound together. It is usually preferred to use the monofunctional radical polymerizable compound in a proportion of 3 to 80% by weight of the radical polymerizable compounds, the proportion of which is 100% by weight, and the polyfunctional radical polymerizable compound in a proportion of 20 to 97% by weight thereof.

<Embodiments of Radical Polymerization Curable Resin Composition>

The curable resin composition used in the present invention is usable as an active energy ray curable resin composition when the curable component of this composition is used as an active energy ray curable component. When an electron beam or the like is used as the active energy ray, the active energy ray curable resin composition does not need to contain any photopolymerization initiator. When an ultraviolet ray or visible ray is used as the active energy ray, this composition preferably contains a photopolymerization initiator.

<<Photopolymerization Initiator>>

The photopolymerization initiator when the radical polymerizable compound is used is appropriately selected in accordance with the active energy ray. When the compound is cured by an ultraviolet ray or visible ray, an ultraviolet or visible-ray-cleavable photopolymerization initiator is used. Examples of this photopolymerization initiator include benzil, benzophenone, benzoylbenzoic acid, 3,3'-dimethyl-4-methoxybenzophenone, and other benzophenone-based compounds; 4-(2-hydroxyethoxy)phenyl (2-hydroxy-2-propyl) ketone, α-hydroxy-α,α'-dimethylacetophenone, 2-methyl-2-hydroxypropiophenone, α-hydroxycyclohexyl phenyl ketone, and other aromatic ketone compounds; methoxyacetophenone, 2,2-dimethoxy-2-phenylacetophenone, 2,2-diethoxyacetophenone, 2-methyl-1-[4-(methylthio)-phenyl]-2-morpholinopropane-1, and other acetophenone-based compounds; benzoin methyl ether, benzoin ethyl ether, benzoin isopropyl ether, benzoin butyl ether, anisoin methyl ether, and other benzoin ether-based compounds; benzyl dimethyl ketal, and other aromatic ketal-based compounds; 2-naphthalenesulfonyl chloride, and other aromatic sulfonyl chloride-based compounds; 1-phenone-1,1-propanedione-2-(o-ethoxycarbonyl) oxime, and other optically active oxime-based compounds; thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, dodecylthioxanthone, and other thioxanthone-based compounds; camphorquinone; halogenated ketones; and acylphosphonoxide; and acyl phosphonate.

The blend amount of the photopolymerization initiator is 20% or less by weight of the whole of the curable resin composition. The blend amount of the photopolymerization initiator is preferably from 0.01 to 20%, more preferably from 0.05 to 10%, even more preferably from 0.1 to 5% by weight of the composition.

When the curable resin composition used in the present invention is used in the state of visible ray curability containing, as a curable component, a radical polymerizable compound, it is preferred to use a photopolymerization initiator high in sensitivity, particularly, to light rays of 380 nm or more wavelength. About the photopolymerization initiator high in sensitivity to light rays of 380 nm or more wavelength, a description will be made later.

It is preferred to use, as the photopolymerization initiator, a compound represented by the following general formula (3) singly:

[Formula 9]

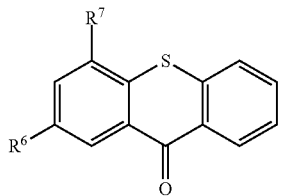

(3)

wherein $R^6$ and $R^7$ each represent —H, —CH$_2$CH$_3$, -iPr or Cl, and $R^6$ and $R^7$ may be the same as or different from each other; or use the compound represented by the general formula (3) together with the photopolymerization initiator high in sensitivity to light rays of 380 nm or more wavelength, this initiator being to be described later. When the compound represented by the general formula (3) is used, the curable resin composition shows a better adhesion than when the photopolymerization initiator high in sensitivity to light rays of 380 nm or more wavelength is singly used. Out of compounds represented by the general formula (3), particularly preferred is diethylthioxanthone, in which $R^6$ and $R^7$ are each —CH$_2$CH$_3$. The composition proportion of the compound represented by the general formula (3) in the curable resin composition is preferably from 0.1 to 5%, more preferably from 0.5 to 4%, even more preferably from 0.9 to 3% by weight of the whole of the curable resin composition.

As required, a polymerization initiation aid is preferably added to the composition. Examples of the polymerization initiation aid include triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate. Ethyl 4-dimethylaminobenzoate is particularly preferred. When the polymerization initiation aid is used, the addition amount thereof is usually from 0 to 5%, preferably from 0 to 4%, most preferably from 0 to 3% by weight of the whole of the curable resin composition.

As required, a known photopolymerization initiator may be together used. A transparent protective film having a UV absorbing power does not transmit any light ray of 380 nm or less wavelength. Thus, it is preferred to use, as the photopolymerization initiator, a photopolymerization initiator high in sensitivity to light rays of 380 nm or more wavelength. Specific examples thereof include 2-methyl-1-(4-methylthiophenyl)-2-morpholinopropane-1-one, 2-benzyl-2-dimethylamino-1-(4-morpholinophenyl)-butanone-1, 2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, and bis(η5-2,4-cyclopentadiene-1-yl)-bis(2,6-difluoro-3-(1H-pyrrol-1-yl)-phenyl)titanium.

It is particularly preferred that together with the photopolymerization initiator of the general formula (3), a compound represented by the following general formula (4) is further used as another photopolymerization initiator:

[Formula 10]

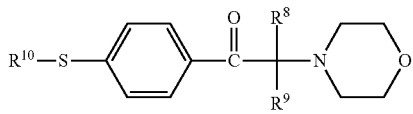

(4)

wherein, $R^8$, $R^9$ and $R^{10}$ each represent —H, —CH$_3$, —CH$_2$CH$_3$, -iPr or Cl, and $R^8$, $R^9$ and $R^{10}$ may be the same or different. A preferably usable example of the compound represented by the general formula (4) is 2-methyl-1-(4-methylthiophenyl)-2-morpholinopropane-1-one, which is also a commercially available product (trade name: IRGACURE 907, maker: the company BASF). Additionally, the following are preferred because of high sensitivity thereof: 2-benzyl-2-dimethylamino-1-(4-morpholinophenyl)-butanone-1 (trade name: IRGACURE 369, maker: the company BASF), and 2-(dimethylamino)-2-[(4-methylphenyl)methyl]-1-[4-(4-morpholinyl)phenyl]-1-butanone (trade name: IRGACURE 379, maker: the company BASF).

<Radical Polymerizable Compound Having Active Methylene Group, and Radical Polymerization Initiator Having Hydrogen-Withdrawing Effect>

When a radical polymerizable compound having an active methylene group is used as the radical polymerizable compound in the above-mentioned active energy ray curable resin composition, it is preferred to combine this compound with a radical polymerization initiator having hydrogen-withdrawing effect. This structure makes a remarkable improvement in the adhesion of the resultant adhesive layer which a polarizing film has even immediately after the polarizing film is taken out, particularly, from a high-humidity environment or water. A reason therefor is unclear; however, the following cause can be considered: While the radical polymerizable compound having an active methylene group is polymerized together with other radical polymerizable compounds included in the adhesive layer, these compounds are taken into a main chain and/or side chains of a base polymer in the adhesive layer, so that the formation of this adhesive layer is attained. When in this polymerization step the radical polymerization initiator having hydrogen-withdrawing effect is present, the base polymer, which is included in the adhesive layer, is produced while hydrogen is withdrawn from the radical polymerizable compound having an active methylene group so that radicals are generated in the methylene groups of molecules of this compound. The methylene groups, from which the radicals are generated, react with hydroxyl groups of the polarizer, such as ones of PVA, to form covalent bonds between the adhesive layer and the polarizer. As a result, in particular, even in a non-dry state, a remarkable improvement is made in the adhesion of the adhesive layer which the polarizing film has. The above-mentioned cause is presumed in this way.

In the present invention, the radical polymerization initiator having hydrogen-withdrawing effect is, for example, a thioxanthone-based radical polymerization initiator, or a benzophenone-based radical polymerization initiator. The radical polymerization initiator is preferably a thioxanthone-based radical polymerization initiator. This thioxanthone-based radical polymerization initiator is, for example, a compound represented by the general formula (3). Specific examples of the compound represented by the general formula (3) include thioxanthone, dimethylthioxanthone, diethylthioxanthone, isopropylthioxanthone, and chlorothioxanthone. Out of compounds represented by the general formula (3), particularly preferred is diethylthioxanthone, in which $R^6$ and $R^7$ are each —CH$_2$CH$_3$.

When the active energy ray curable resin composition includes the radical polymerizable compound having an active methylene group and the radical polymerization initiator having hydrogen-withdrawing effect, it is preferred that the composition includes the radical polymerizable compound having the active methylene group in a proportion of 1 to 50% by weight of the whole of the curable components, the proportion of which is regarded as 100% by weight, and includes the radical polymerization initiator in a proportion of 0.1 to 10% by weight of the whole of the curable resin composition.

As described above, in the present invention, in the presence of the radical polymerization initiator having hydrogen-withdrawing effect, molecules of the radical polymerizable compound having an active methylene group are caused to generate radicals in their methylene groups, so that the methylene groups react with hydroxyl groups of the polarizer, such as ones of PVA, to form covalent bonds. Accordingly, in order to cause molecules of the radical polymerization initiator having an active methylene group to generate radicals in their methylene groups to form such covalent bonds sufficiently, the composition includes the radical polymerizable compound having the active methylene group in a proportion preferably from 1 to 50%, more preferably from 3 to 30% by weight of the whole of the curable components, the proportion of which is regarded as 100% by weight. In order to improve the composition sufficiently in water resistance to improve the composition in adhesion in a non-dry state, the proportion of the radical polymerizable compound having an active methylene group is set preferably to 1% or more by weight. In the meantime, if the proportion is more than 50% by weight, the adhesive layer may undergo curing poorness. The proportion of the radical polymerization initiator having hydrogen-withdrawing effect is included in a proportion preferably from 0.1 to 10%, more preferably from 0.3 to 9% by weight of the whole of the curable resin composition. In order to advance the hydrogen-withdrawing reaction sufficiently, the radical polymerization initiator is used preferably in a proportion of 0.1% or more by weight. In the meantime, if the proportion is more than 10% by weight, the initiator may not be completely dissolved in the composition.

<2. Cationic Polymerization Curable Resin Composition>

Cationically polymerizable compounds used in the cationic polymerization curable resin composition are classified to monofunctional cationically polymerizable compounds, which each have, in the molecule thereof, one cationically polymerizable functional group and polyfunctional cationically polymerizable compounds, which each have, in the molecule thereof, two or more cationically polymerizable functional groups. The monofunctional cationically polymerizable compounds are relatively low in liquid viscosity; thus, the incorporation of any one of these compounds into the resin composition allows to lower the resin composition in liquid viscosity. Moreover, the monofunctional cationically polymerizable compounds each have functional groups for expressing various functions in many cases; thus, the incorporation of any one of these compounds into the resin composition allows to cause the resin composition and/or a cured product of the resin composition to express various functions. The polyfunctional cationically polymerizable compounds can three-dimensionally cross-link the cured product of the resin composition; thus, it is preferred to incorporate any one of these compounds into the resin composition. About the ratio between the monofunctional cationically polymerizable compound and the polyfunctional cationically polymerizable compound, it is preferred to blend 10 to 1000 parts by weight of the polyfunctional cationically polymerizable compound with 100 parts by weight of the monofunctional cationically polymerizable compound. Examples of a cationically polymerizable functional group thereof include epoxy, oxetanyl, and vinyl ether groups. Examples of a compound having an epoxy group include aliphatic epoxy compounds, alicyclic epoxy compounds, and aromatic epoxy compounds. The cationic polymerization curable resin composition of the present invention in particular preferably includes an alicyclic epoxy compound since the composition is excellent in curability and adhesion. Examples of the alicyclic epoxy compound include 3,4-epoxycyclohexylmethyl-3,4-epoxycyclohexane carboxylate, and caprolactone-modified products, trimethylcaprolactone-modified product and valerolactone-modified products of 3,4-epoxycyclohexylmethyl-3,4-epoxycyclohexane carboxylate. Specific examples thereof include CELLOXIDE 2021, CELLOXIDE 2021A, CELLOXIDE 2021P, CELLOXIDE 2081, CELLOXIDE 2083, and CELLOXIDE 2085 (each manufactured by Daicel Chemical Industries, Ltd.), and CYRACURE UVR-6105, CYLACURE UVR-6107, CYRACUR 30, and CYRACUR R-6110 (each manufactured by Dow Chemical Co. Japan Ltd.). A compound having an oxetanyl group has advantageous effects of improving the curability of the cationic polymerization curable resin composition of the present invention, and of lowering the liquid viscosity of the composition. Thus, it is preferred to incorporate this compound into the composition. Examples of the compound having an oxetanyl group include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl] ether, 3-ethyl-3-(2-ethylhexyloxymethyl) oxetane, and phenol novolac oxetane. The following products are commercially available: ARON OXETANE OXT-101, ARON OXETANE OXT-121, ARON OXETANE OXT-211, ARON OXETANE OXT-221, and ARON OXETANE OXT-212 (each manufactured by Toagosei Co., Ltd.). A compound having a vinyl ether group has advantageous effects of improving the curability of cationic polymerization curable resin composition of the present invention, and of lowering the liquid viscosity of the composition. Thus, it is preferred to incorporate the compound into the composition. Examples of the compound having a vinyl ether group include 2-hydroxyethyl vinyl ether, diethylene glycol monovinyl ether, 4-hydroxybutyl vinyl ether, diethylene glycol monovinyl ether, triethylene glycol divinyl ether, cyclohexanedimethanol divinyl ether, cyclohexanedimethanol monovinyl ether, tricyclodecane vinyl ether, cyclohexyl vinyl ether, methoxyethyl vinyl ether, ethoxyethyl vinyl ether, pentaerythritol type tetravinyl ether.

<Cationic Photopolymerization Initiator>

The cationic polymerization curable resin composition includes, as its curable component, at least one compound selected from compounds each having an epoxy group, compounds each having an oxetanyl group, and compounds each having a vinyl ether group, which have been as described above. These compounds are each a compound cured by cationic polymerization. Accordingly, a cationic photopolymerization initiator is blended into the composition. This cationic photopolymerization initiator is irradiated with one or more active energy rays, such as visible rays, ultraviolet rays, X rays, and an electron beam, to generate a cation species or a Lewis acid. Consequently, a polymerization reaction of the epoxy group or oxetanyl group is initiated. The cationic photopolymerization initiator is preferably an optically acid-generating agent, which will be detailed later. When the curable resin composition used in the present invention is used in a visible ray curable form, it is preferred to use a cationic photopolymerization initiator high in sensitivity, particularly, to light rays of 380 nm or more wavelength. The cationic photopolymerization initiator is generally a compound showing a maximum absorption near a wavelength of 300 nm or in a range of wavelengths shorter than 300 nm. By blending, into the resin composition, an optical sensitizer having a maximum absorption in a wavelength range longer than the range mentioned just above, specifically at a light ray of a wavelength longer than 380 nm, the photopolymerization initiator can be sensitized with a light ray of a wavelength in or around this range to promote the generation of a cationic species or an acid from the cationic photopolymerization initiator. Examples of the optical sensitizer include anthracene compounds, pyrene compounds, carbonyl compounds, organic sulfur compounds, persulfides, redox compounds, azo and diazo compounds, halogenated compounds, and optically reducible colorants. These may be used in the form of a mixture of two or more thereof. Particularly preferred are anthracene compounds since the compounds are excellent in optically sensitizing effect. Specific examples thereof include products ANTHRACURE UVS-1331, and ANTHRACURE UVS-1221 (each manufactured by Kawasaki Kasei Chemicals, Ltd.). The content amount of the optical sensitizer(s) is preferably from 0.1 to 5% by weight, more preferably from 0.5 to 3% by weight.

<Other Components>

The curable resin composition used in the present invention preferably contains components described below.

<Acrylic Oligomer>

The active energy ray curable resin composition used in the present invention may contain, besides the curable component related to the above-mentioned radical polymerizable compound, an acrylic oligomer obtained by polymerizing a (meth)acrylic monomer. By incorporating the component into the active energy ray curable resin composition, this composition is decreased in curing shrinkage when irradiated with an active energy ray to be cured, so that interfacial stress can be decreased between the adhesive, and adherends such as a polarizer and a transparent protective film. As a result, the adhesion between the adhesive layer and the adherends can be restrained from being lowered. In order to restrain the curing shrinkage of the cured product layer (adhesive layer) sufficiently, the content of the acrylic oligomer in the curable resin composition is preferably 20% or less, more preferably 15% or less by weight of the whole of the composition. If the content of the acrylic oligomer in the curable resin composition is too large, the composition is intensely lowered in reaction rate when irradiated with an active energy ray. Thus, the composition may be poorly cured. In the meantime, the acrylic oligomer is contained in the curable resin composition in a proportion that is preferably 3% or more, more preferably 5% or more by weight of the whole of the curable resin composition.

The active energy ray curable resin composition is preferably low in viscosity in a case where a consideration is made about the workability or evenness of the composition when the composition is painted. Thus, it is also preferred that the acrylic oligomer, which is obtained by polymerizing a (meth)acrylic monomer, is also low in viscosity. About the acrylic oligomer that is low in viscosity and can prevent the resultant adhesive layer from undergoing curing shrinkage, the weight-average molecular weight (Mw) thereof is preferably 15000 or less, more preferably 10000 or less, in particular preferably 5000 or less. In the meantime, in order to restrain the cured product layer (adhesive layer) sufficiently from undergoing curing shrinkage, the weight-average molecular weight (Mw) of the acrylic oligomer is preferably 500 or more, more preferably 1000 or more, in particular preferably 1500 or more. Specific examples of the (meth)acrylic monomer, from which the acrylic oligomer is made, include methyl (meth)acrylate, ethyl (meth)acrylate, n-propyl (meth)acrylate, isopropyl (meth)acrylate, 2-methyl-2-nitropropyl (meth)acrylate, n-butyl (meth)acrylate, isobutyl (meth)acrylate, S-butyl (meth)acrylate, t-butyl (meth)acrylate, n-pentyl (meth)acrylate, t-pentyl (meth)acrylate, 3-pentyl (meth)acrylate, 2,2-dimethylbutyl (meth)acrylate, n-hexyl (meth)acrylate, cetyl (meth)acrylate, n-octyl (meth)acrylate, 2-ethylhexyl (meth)acrylate, 4-methyl-2-propylpentyl (meth)acrylate, N-octadecyl (meth)acrylate, and other ($C_1$-$C_{20}$)alkyl esters of (meth)acrylic acid; and cycloalkyl (meth)acrylates (such as cyclohexyl (meth)acrylate, and cyclopentyl (meth)acrylate), aralkyl (meth)acrylates (such as benzyl (meth)acrylate), polycyclic (meth)acrylates (such as 2-isobornyl (meth)acrylate, 2-norbornylmethyl (meth)acrylate, 5-norbornene-2-yl-methyl (meth)acrylate, and 3-methyl-2-norbornylmethyl (meth)acrylate), hydroxy-group-containing (meth)acrylates (such as hydroxyethyl (meth)acrylate, 2-hydroxypropyl (meth)acrylate, and 2,3-dihydroxypropylmethyl-butyl (meth)methacrylate), alkoxy-group- or phenoxy-group-containing (meth)acrylates (such as 2-methoxyethyl (meth)acrylate, 2-ethoxyethyl (meth)acrylate, 2-methoxymethoxyethyl (meth)acrylate, 3-methoxybutyl (meth)acrylate, ethylcarbitol (meth)acrylate, and phenoxyethyl (meth)acrylate), epoxy group-containing (meth)acrylates (such as glycidyl (meth)acrylate), halogen-containing (meth)acrylates (such as 2,2,2-trifluoroethyl (meth)acrylate, 2,2,2-trifluoroethylethyl (meth)acrylate, tetrafluoropropyl (meth)acrylate, hexafluoropropyl (meth)acrylate, octafluoropentyl (meth)acrylate, and heptadecafluorodecyl (meth)acrylate), and alkylaminoalkyl (meth)acrylates (such as dimethylaminoethyl (meth)acrylate). These (meth)acrylates may be used singly or in combination of two or more thereof. Specific examples of the acrylic oligomer include products "ARUFON" manufactured by Toagosei Co., Ltd., "ACT-FLOW" manufactured by Soken Chemical & Engineering Co., Ltd., and "JONCRYL" manufactured by BASF Japan Ltd.

<Optical Acid Generator>

The active energy ray curable resin composition may contain an optical acid generator. When the active energy ray curable resin composition contains the optical acid generator, the adhesive layer can be abruptly made better in water resistance and endurance when the composition does not contain any optical acid generator. The optical acid generator can be represented by the following general formula (5)

General formula (5)

$$L^+X^- \qquad \text{[Formula 11]}$$

wherein $L^+$ represents any onium cation, and $X^-$ represents a counter anion selected from the group consisting of $PF_6^-$, $SbF_6^-$, $AsF_6^-$, $SbCl_6^-$, $BiCl_5^-$, $SnCl_6^-$, $ClO_4^-$, a dithiocarbamate anion, and $SCN^-$.

Next, a description will be made about the counter anion $X^-$ in the general formula (5).

The counter anion $X^-$ in the general formula (5) is not particularly limited in principle, and is preferably a non-nucleophilic anion. When the counter anion $X^-$ is the non-nucleophilic anion, a nucleophilic reaction is not easily caused with a cation existing therewith in the molecule or various materials used together. As a result, the optical acid generator itself, which is represented by the general formula (4), and a composition using this agent can be improved in stability over time. The non-nucleophilic anion referred to herein denotes an anion low in power for causing nucleophilic reaction. Examples of the anion include $PF_6^-$, $SbF_6^-$, $AsF_6^-$, $SbCl_6^-$, $BiCl_5^-$, $SnCl_6^-$, $ClO_4^-$, a dithiocarbamate anion, and $SCN^-$.

Preferred and specific examples of the optical acid generator in the present invention include products "CYRACURE UVI-6992", and "CYRACURE UVI-6974" (manufactured by Dow Chemical Japan Ltd.), "ADEKA OPTOMER SP150", "ADEKA OPTOMER SP152", "ADEKA OPTOMER SP170", and "ADEKA OPTOMER SP172" (manufactured by ADEKA Corp.), "IRGACURE 250" (manufactured by Ciba Specialty Chemicals Corp.), "CI-5102", and "CI-2855" (manufactured by Nippon Soda Co., Ltd.), "SAN-AID SI-60L", "SAN-AID SI-80L", "SAN-AID SI-100L", "SAN-AID SI-110L", and "SAN-AID SI-180L" (manufactured by Sanshin Chemical Industry Co., Ltd.), "CPI-100P", and "CPI-100A" (manufactured by San-Apro Ltd.), and "WPI-069", "WPI-113", "WPI-116", "WPI-041", "WPI-044", "WPI-054", "WPI-055", "WPAG-281", "WPAG-567", and "WPAG-596" (each manufactured by Wako Pure Chemical Industries, Ltd.).

The content of the optical acid generator is 10% or less, preferably from 0.01 to 10%, more preferably from 0.05 to 5%, in particular preferably from 0.1 to 3% by weight of the whole of the curable resin composition.

<Compound Containing any One of Alkoxy Group and Epoxy Group>

About the active energy ray curable resin composition, the optical acid generator may be used together with a compound containing any one of an alkoxy group and an epoxy group in the active energy ray curable resin composition.

(Compound Containing Epoxy Group)

In the case of using a compound having in the molecule thereof one or more epoxy groups, or a polymer having in the molecule thereof two or more epoxy groups (epoxy resin), a compound having in the molecule thereof two or more functional groups reactive with any epoxy group may be used together. Examples of the functional group(s) reactive with any epoxy group include a carboxyl group, a phenolic hydroxyl group, a mercapto group, and a primary or secondary aromatic amino group. The compound in particular preferably has, in a single molecule thereof, two or more of these functional groups in terms of three-dimensional curable property.

The polymer having in the molecule thereof one or more epoxy groups is, for example, an epoxy resin. Examples thereof include bisphenol A type epoxy resin derived from bisphenol A and epichlorohydrin, bisphenol F type epoxy resin derived from bisphenol F and epichlorohydrin, bisphenol S type epoxy resin, phenol novolak type epoxy resin, cresol novolak type epoxy resin, bisphenol A novolak type epoxy resin, bisphenol F novolak type epoxy resin, alicyclic epoxy resin, diphenyl ether type epoxy resin, hydroquinone type epoxy resin, naphthalene type epoxy resin, biphenyl type epoxy resin, fluorene type epoxy resin, polyfunctional epoxy resins such as trifunctional epoxy resin and tetrafunctional epoxy resin, glycidylester type epoxy resin, glycidylamine type epoxy resin, hydantoin type epoxy resin, isocyanurate type epoxy resin, and aliphatic linear epoxy resin. These epoxy resins may be halogenated, and may be hydrogenated. Examples of a commercially available product of the epoxy resin include JER COATS 828, 1001, 801N, 806, 807, 152, 604, 630 and 871, YX8000, YX8034, and YX4000 manufactured by Japan Epoxy Resins Co., Ltd.; EPICLONs 830, EXA 835LV, HP 4032D, HP 820 manufactured by DIC Corp. Corp.; EP 4100 series, EP 4000 series, and EPU series manufactured by ADEKA Corp.; CELLOXIDE series (for example, 2021, 2021P, 2083, 2085, and 3000), EPOLEAD series, and EHPE series manufactured by Daicel Corp.; YD series, YDF series, YDCN series, YDB series, and phenoxy resins (YP series and others: polyhydroxypolyethers each synthesized from bisphenol and epichlorohydrin and having at both ends thereof epoxy groups, respectively) manufactured by Nippon Steel Chemistry Co., Ltd.; DENACOL series manufactured by Nagase ChemteX Corp.; and EPO LIGHT series and others, manufactured by Kyoeisha Chemical Co., Ltd. However, the commercially available epoxy resin product is not limited to these examples. These epoxy resins may be used in combination of two or more thereof.

(Compound and Polymer Each Having Alkoxyl Group) The compound having in the molecule thereof an alkoxyl group is not particularly limited as far as the compound is a compound having in the molecule thereof one or more alkoxyl groups. The compound may be any known compound. Typical examples of the compound include a melamine compound, an amino resin, and a silane coupling agent.

The blend amount of the compound containing any one of an alkoxyl group and an epoxy group is usually 30% or less by weight of the whole of the curable resin composition. If the content of the compound in the composition is too large, the curable resin composition is lowered in adhesion, so that the impact resistance thereof may be deteriorated in a dropping test. The content of the compound in the composition is more preferably 20% or less by weight. In the meantime, the composition contains the compound in a proportion that is preferably 2% or more, more preferably 5% or more by weight from the viewpoint of the water resistance of the composition.

<Silane Coupling Agent>

When the curable resin composition used in the present invention is active energy ray curable, the silane coupling agent is preferably an active energy ray curable compound. However, even when the silane coupling agent is not active energy ray curable, this agent can give substantially the same water resistance to the composition.

Specific examples of the silane coupling agent include, as active energy ray curable compounds, vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxy silane.

The silane coupling agent is preferably 3-methacryloxypropyltrimethoxysilane, or 3-acryloxypropyltrimethoxysilane.

A specific example of the silane coupling agent that is not active energy ray curable is a silane coupling agent having an amino group. Specific examples of the silane coupling agent having an amino group include γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, and other amino-group-containing silanes; and N-(1,3-dimethylbutylidene)-3-(triethoxysilyl)-1-propanamine, and other ketimine type silanes.

Such silane coupling agents each having an amino group may be used singly, or in combination of two or more thereof. Out of these silane coupling agents, the following are preferred in order for the curable resin composition to ensure good adhesion: γ-aminopropyltrimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, and N-(1,3-dimethylbutylidene)-3-(triethoxysilyl)-1-propanamine.

The blend amount of the silane coupling agent(s) is preferably from 0.01 to 20%, preferably from 0.05 to 15%, even more preferably from 0.1 to 10% by weight of the whole of the curable resin composition. If the blend amount is more than 20% by weight, the curable resin composition is deteriorated in storage stability. If the blend amount is less than 0.1% by weight, the composition does not sufficiently exhibit an adhesion water-resistance effect.

Specific examples of the silane coupling agent that is not active energy ray curable, these examples being other than the above-mentioned examples, include 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, and imidazolesilane.

<Compound Having Vinyl Ether Group>

The curable resin composition used in the present invention may contain a compound having a vinyl ether group. This case is favorable since a polarizer and the resultant adhesive layer are improved in adhesion water-resistance therebetween. Reasons why this advantageous effect is gained are unclear; however, it is presumed that one of the reasons is as follows: the vinyl ether group, which the compound has, interacts with the polarizer to heighten the adhering strength between the polarizer and the adhesive layer. In order to heighten the polarizer and the adhesive layer further in adhesion water-resistance therebetween, the compound is preferably a radical polymerizable compound having a vinyl ether group. The content of the compound is preferably from 0.1 to 19% by weight of the whole of the curable resin composition.

<Keto-Enol Tautomerism Generable Compound>

A compound in which keto-enol tautomerism is generable may be incorporated into the curable resin composition used in the present invention. It is preferred to use, for example, an embodiment in which this keto-enol tautomerism generable compound is contained in the curable resin composition that contains a crosslinking agent or that is usable in the state of blending a crosslinking agent into the composition. This embodiment allows to restrain the curable resin composition after the blending of the organometallic compound from being excessively raised in viscosity or gelatinized, and from undergoing the production of a micro-gelatinized product to realize an effect of prolonging the pot life of this composition.

The keto-enol tautomerism generable compound may be a β-dicarbonyl compound that may be of various types. Specific examples thereof include acetylacetone, 2,4-hexanedione, 3,5-heptanedione, 2-methylhexane-3,5-dione, 6-methylheptane-2,4-dione, 2,6-dimethylheptane-3,5-dione, and other β-diketones; methyl acetoacetate, ethyl acetoacetate, isopropyl acetoacetate, tert-butyl acetoacetate, and other acetoacetates; ethyl propionylacetate, ethyl propionylacetate, isopropyl propionylacetate, tert-butyl propionylacetate, and other propionylacetates; ethyl isobutyrylacetate, ethyl isobutyrylacetate, isopropyl isobutyrylacetate, tert-butyl isobutyrylacetate, and other isobutyrylacetates; and methyl malonate, ethyl malonate, and other malonates. Out of these examples, acetylacetone and acetoacetates are preferred compounds. These keto-enol tautomerism generable compounds may be used singly or in combination of two or more thereof.

The use amount of the keto-enol tautomerism generable compound(s) may be, for example, from 0.05 to 10 parts, preferably from 0.2 to 3 parts (for example, from 0.3 to 2 parts) by weight per part by weight of the organometallic compound. If the use amount of the compound(s) is less than 0.05 part by weight per part by weight of the organometallic compound, the use effects thereof may not be sufficiently exhibited with ease. In the meantime, if the use amount of the compound(s) is more than 10 parts by weight per part by weight of the organometallic compound, the compound(s) interact(s) excessively with the organometallic compound so that a target water resistance may not be easily expressed.

<Additives Other than Above-Mentioned Components>

Various additives may be blended, as other optional components, into the curable resin composition used in the present invention as far as the object and advantageous effects of the invention are not damaged. Examples of the additives include epoxy resin, polyamide, polyamideimide, polyurethane, polybutadiene, polychloroprene, polyether, polyester, styrene-butadiene block copolymer, petroleum resin, xylene resin, ketone resin, cellulose resin, fluorine-contained oligomer, silicone-based oligomer, polysulfide-based oligomer, and other polymers or oligomers; phenothiazine, 2,6-di-t-butyl-4-methylphenol, and other polymerization inhibitors; polymerization initiation aids; leveling agents; wettability improvers; surfactants; plasticizers; ultraviolet absorbers; inorganic fillers; pigments; and dyes.

The amount of the additives is usually from 0 to 10%, preferably from 0 to 5%, most preferably from 0 to 3% by weight of the whole of the curable resin composition.

<Viscosity of Adhesive Composition>

The viscosity of the curable resin composition of the present invention is preferably 100 cp or less at 25° C. from the viewpoint of the paintability of the composition. If the curable resin composition of the present invention has a viscosity more than 100 cp at 25° C., the curable resin composition is controlled about the temperature thereof when painted, and is usable in the state of adjusting the viscosity to 100 cp or less. The viscosity ranges more preferably from 1 to 80 cp, most preferably from 10 to 50 cp. The viscosity is measurable, using an E type viscometer TVE22LT, manufactured by Toki Sangyo Co., Ltd.

In the curable resin composition used in the present invention, it is preferred to use, as the curable component(s), one or more materials low in skin irritation from the viewpoint of safety. The skin irritation can be judged, using an index of P.I.I. The P.I.I is widely used as an index showing the degree of skin disorder, and is measured by a Draize method. The measured value thereof is represented in a range from 0 to 8. As this value is smaller, the irritation is judged to be lower. However, the measured value includes a large accidental error; thus, it is advisable to understand this index as a reference value. The P.I.I is preferably 4 or less, more preferably 3 or less, most preferably 2 or less.

<Bulk Absorption Coefficient>

About the curable adhesive composition of the present invention for polarizing film, the bulk absorption coefficient described above is preferably 10% or less by weight, this coefficient being measured when a cured product yielded by curing the curable adhesive composition is immersed in pure water of 23° C. temperature for 24 hours. When a polarizing film is put in a severe environment of a high-temperature and high-humidity (for example, at 85° C. and 85% RH), water that has permeated its transparent protective film and adhesive layer invades its polarizer so that the crosslinked structure thereof is hydrolyzed to disturb the alignment of a dichroic colorant therein. Consequently, the polarizing film is deteriorated in optical endurances. For example, the film is raised in transmittance or lowered in polarization degree. By setting the bulk absorption coefficient of the adhesive layer to 10% or less by weight, the shift of water to the polarizer is restrained when the polarizing film is put in a severe environment of a high temperature and a high humidity. Thus, the polarizer can be restrained from being raised in transmittance and lowered in polarization degree. In order to make the optical endurances better in a severe environment of a high temperature, the water absorption coefficient about the adhesive layer of the polarizing film is preferably 5% or less, more preferably 3% or less, most preferably 1% or less by weight. In the meantime, when a polarizer and a transparent protective film are bonded to each other, the polarizer keeps a predetermined amount of water. When the present curable adhesive composition contacts water contained in the polarizer, external appearance defects, such as repulsion and air bubbles, may be generated. In order to restrain the external appearance defects, it is preferred that the curable adhesive composition can absorb a predetermined amount of water. More specifically, the bulk absorption coefficient is preferably 0.01% or more, more preferably 0.05% or more by weight. The bulk absorption coefficient is specifically measured by an absorption water coefficient testing method described in JIS K 7209.

<Polarizing Film>

The polarizing film of the present invention is a polarizing film including a polarizer, and a cured resin layer yielded by curing the curable resin composition and positioned on/over at least one surface of the polarizer, in particular preferably, in which the cured resin layer is an adhesive layer, and a transparent protective film is laid over at least one surface of the polarizer to interpose the adhesive layer between the surface and the transparent protective film. The following will describe the polarizing film, giving, as an example, a polarizing film in which a transparent protective film is laid over at least one surface of a polarizer to interpose an adhesive layer therebetween.

<Cured Resin Layer>

A cured resin layer, in particular, an adhesive layer that is made of/from the curable resin composition preferably has a thickness of 0.01 to 3.0 μm. If the thickness of the cured resin layer is too small, the cured resin layer is short in cohesive strength to be unfavorably lowered in peel strength. If the thickness of the cured resin layer is too large, the polarizing film is easily peeled off when stress is applied to a cross section of the polarizing film. Thus, unfavorably, a peel failure is easily generated therein by impact. The thickness of the cured resin layer is more preferably from 0.1 to 2.5 μm, most preferably from 0.5 to 1.5 μm.

About the curable resin composition, the cured resin layer, in particular, the adhesive layer that is made of/from this composition preferably has a Tg selected to be 60° C. or higher. The Tg is more preferably 70° C. or higher, even more preferably 75° C. or higher, even more preferably 100° C. or higher, even more preferably 120° C. or higher. If the Tg of the adhesive layer is too high, the polarizing film is lowered in bendability. Thus, the Tg of the adhesive layer is more preferably 300° C. or lower, even more preferably 240° C. or lower, even more preferably 180° C. or lower. The Tg<glass transition temperature> is measured using a dynamic viscoelasticity measuring instrument RSA III manufactured by a company TA Instruments under the following measuring conditions:

Sample size: 10 mm in width and 30 mm in length,
Clamp distance: 20 mm,
Measuring mode: tension, Frequency: 1 Hz, and Temperature-raising rate: 5° C./minute. The dynamic viscoelasticity of a sample was measured, and the temperature of a peak top of the tan δ thereof was adopted as the Tg of the sample.

About the curable resin composition, the cured resin layer, in particular, the adhesive layer that is made of/from this composition preferably has a storage modulus of $1.0 \times 10^7$ Pa or more at 25° C. The storage modulus is more preferably $1.0 \times 10^8$ Pa or more. For reference, the storage modulus of a pressure-sensitive-adhesive layer is from $1.0 \times 10^3$ to $1.0 \times 10^6$ Pa, and is different from that of the adhesive layer. When the polarizing film is subjected to heat cycles (for example, from −40 to 80° C.), the storage modulus of the adhesive layer affects cracking in the polarizer. When the storage modulus is low, an inconvenience of the polarizer-cracking is easily generated. The range of temperatures at which the cured resin layer has a high storage modulus is more preferably 80° C. or lower, most preferably 90° C. or lower. At the same time of measuring the Tg<glass transition temperature>, the storage modulus is measured using the dynamic viscoelasticity measuring instrument RSA III manufactured by the company TA Instruments under the same measuring conditions. The dynamic viscoelasticity of a sample is measured, and the storage modulus (E') value thereof was adopted.

The polarizing film according to the present invention can be favorably produced by a producing method including the following steps:

an applying step of applying the curable resin composition used in the present invention to at least one surface of a polarizer, and a curing step of radiating an active energy ray to the workpiece from a polarizer surface side or a curable resin composition applied surface thereof to cure the curable resin composition. In this producing method, the water content in the polarizer is preferably from 8 to 19% in its adhering step. Furthermore, a polarizing film in which a transparent protective film is laid over at least one surface of a polarizer to interpose an adhesive layer therebetween can be produced by a producing method including the following steps:

an applying step of applying the curable resin composition to at least surface of the polarizer and the transparent protective film, a bonding step of bonding the polarizer and the transparent protective film to each other, and an adhering step of radiating an active energy ray to the workpiece from a polarizer surface side or transparent protective film surface side thereof to cure the curable resin composition, and further causing the polarizer and the transparent protective film to adhere to each other through the resultant adhesive layer.

Before the application of the curable resin composition, the polarizer and the transparent protective film may each be subjected to a surface modifying treatment. In particular, about the polarizer, before the application of the curable resin composition or the bonding, it is preferred to subject the surface of the polarizer to a surface modifying treatment. Examples of the surface modifying treatment include corona treatment, plasma treatment, and ITRO treatment. The surface modifying treatment is in particular preferably corona treatment. When the surface is subjected to corona treatment, polar functional groups such as carbonyl and amino groups are produced in the polarizer surface to improve this surface and the cured resin layer in adhesiveness therebetween. Moreover, the resultant ashing effect causes the contaminants on the surface to be removed, and decreases irregularities in the surface, so that a polarizing film excellent in external appearance properties can be produced.

The means for the application of the curable resin composition is appropriately selected in accordance with the viscosity of the curable resin composition, and a target thickness of the resultant layer. Examples of the means include a reverse coater, a (direct, revere or offset) gravure coater, a bar reverse coater, a roll coater, a die coater, a bar coater, and a rod coater. The viscosity of the curable resin composition used in the present invention is preferably from 3 to 100 mPa·s, more preferably from 5 to 50 mPa·s, most preferably from 10 to 30 mPa·s. It is not preferred that the viscosity of the curable resin composition is high since the layer yielded after the application of the composition is poor in surface smoothness so that the external appearance unfavorably becomes poor. The curable resin composition used in the present invention is applicable in the state of being heated or cooled to be adjusted into a viscosity in the preferred range.

The polarizer and the transparent protective film are bonded each other to interpose, therebetween, the curable resin composition applied as described above. The bonding of the polarizer and the transparent protective film to each other can be attained, using, for example, a roll laminator.

<Curing of Curable Resin Composition>

The curable resin composition used in the present invention is preferably used as an active energy ray curable resin composition. The active energy ray curable resin composition is usable in an electron beam curable, ultraviolet curable or visible ray curable form. The form of the curable resin composition is preferably a visible ray curable resin composition from the viewpoint of the producibility thereof.

<<Active Energy Ray Curability>>

About the active energy ray curable resin composition, a polarizer and a transparent protective film are bonded to each other, and subsequently the resultant adherent body is irradiated with an active energy ray (such as an electron beam, an ultraviolet ray or a visible ray) to cure the active energy ray curable resin composition to form an adhesive layer. A direction along which the active energy ray (which is, for example, an electron beam, an ultraviolet ray or a visible ray) is radiated may be any appropriate radiating direction. Preferably, the active energy ray is radiated from the transparent protective film side of the adherent body. If the active energy ray is radiated from the polarizer side thereof, the polarizer may be unfavorably deteriorated by the active energy ray (which is, for example, an electron beam, an ultraviolet ray or a visible ray).

<<Electron Beam Curability>>

About the electron beam curability, conditions for radiating the electron beam may be arbitrarily-selected appropriate conditions as far as the conditions are conditions under which the active energy ray curable resin composition is curable. About the electron beam radiation, for example, the accelerating voltage is preferably from 5 to 300 kV, more preferably from 10 to 250 kV. If the accelerating voltage is less than 5 kV, the electron beam may not reach the adhesive so that the adhesive may not be unfavorably cured sufficiently. If the accelerating voltage is more than 300 kV, the penetrating power of the beam into a sample is too strong, so that the beam may unfavorably damage its transparent protective film or polarizer. The radiation ray quantity thereof is from 5 to 100 kGy, more preferably from 10 to 75 kGy. If the radiation ray quantity is less than 5 kGy, the adhesive is insufficiently cured. If the quantity is more than 100 kGy, the transparent protective film or the polarizer is damaged, so that the polarizing film is lowered in mechanical strength or yellowed not to gain predetermined optical properties.

The electron beam radiation is usually performed in an inert gas. If necessary, the radiation may be performed in the atmospheric air or under conditions that a small amount of oxygen is introduced into an inert gas. An appropriate introduction of oxygen dares to cause oxygen blocking in a surface of the transparent protective film onto which the electron beam is to be initially radiated, so that the beam can be prevented from damaging the transparent protective film to radiate the electron beam effectively only to the adhesive although this matter depends on the material of the transparent protective film.

<<Ultraviolet Curability and Visible Ray Curability>>

In a method for producing the polarizing film according to the present invention, it is preferred to use, as active energy rays, rays including visible rays having wavelengths ranging from 380 to 450 nm, particularly, active energy rays in which the radiation quantity of visible rays having wavelengths ranging from 380 to 450 nm is the largest. When a transparent protective film to which ultraviolet ray absorbing power is given (ultraviolet non-transmissible type transparent protective film) is used about the ultraviolet curability or visible ray curability, the transparent protective film absorbs light rays having wavelengths shorter than about 380 nm; thus, the light rays having wavelengths shorter than 380 nm do not reach the active energy ray curable resin composition not to contribute to a polymerization reaction of the composition. Furthermore, the light rays having wavelengths shorter than 380 nm, which are absorbed by the transparent protective film, are converted to heat, so that the transparent protective film itself generates heat. The heat causes defects of the polarizing film, such as a curling or wrinkles of the film. Thus, in the case of adopting, in the present invention, the ultraviolet curability or visible ray curability, it is preferred to use, as an active energy ray generating device, a device which does not emit light rays shorter than 380 nm. More specifically, such a device is a device in which the ratio of the integrated illuminance of light rays having a wavelength range from 380 to 440 mm to that of light rays having a wavelength range from 250 to 370 nm is preferably from 100/0 to 100/50, more preferably from 100/0 to 100/40. For the active energy ray related to the present invention, preferred is a gallium sealed metal halide lamp, or an LED light source emitting light rays having a wavelength range from 380 to 440 nm. Alternatively, a light source including ultraviolet rays and visible rays is usable, examples of which include a low pressure mercury lamp, a middle pressure mercury lamp, a high pressure mercury lamp, a super high pressure mercury lamp, an incandescent lamp, a xenon lamp, a halogen lamp, a carbon arc lamp, a metal halide lamp, a fluorescent lamp, a tungsten lamp, a gallium lamp, an excimer laser, and sunlight. It is allowable to use light rays about which a bandpass filter is used to block ultraviolet rays having wavelengths shorter than 380 nm. In order to heighten the adhesive performance of the adhesive layer between the polarizer and the transparent protective film, and simultaneously prevent the polarizing film from being curled, it is preferred to use an active energy ray obtained by using a gallium sealed metal halide lamp and further passing light therefrom through a bandpass filter which can block light rays having wavelengths shorter than 380 nm; or use an active energy ray having a wavelength of 405 nm, which is obtained by using an LED light source.

About the ultraviolet curability or visible ray curability, it is preferred to heat the active energy ray curable resin composition before the radiation of ultraviolet rays or visible rays (heating before radiation) to the composition. In this case, the composition is heated preferably to 40° C. or higher, more preferably to 50° C. or higher. It is also preferred to heat the active energy ray curable resin composition after the radiation of ultraviolet rays or visible rays (heating after radiation) thereto. In this case, the composition is heated preferably to 40° C. or higher, more preferably to 50° C. or higher.

The active energy ray curable resin composition according to the present invention is favorably usable, particularly, when an adhesive layer is formed for bonding a polarizer to a transparent protective film about which the transmittance of light rays having a wavelength of 365 nm is less than 5%. At this time, the active energy ray curable resin composition according to the invention may include a photopolymerization initiator of the general formula (3); in this case, by radiating ultraviolet rays to the composition across the transparent protective film having UV absorbing power, the composition can be cured to form an adhesive layer. Thus, also in a polarizing film in which transparent protective films having UV absorbing power are laminated, respectively, onto two surface of a polarizer, its adhesive layers can be cured. Naturally, however, also in a polarizing film in which a transparent protective film having no UV absorbing power is laminated, its adhesive layers can be cured. The wording "transparent protective film having UV absorbing power" means a transparent protective film about which the transmittance of a light ray having a wavelength of 380 nm is less than 10%.

The method for giving UV absorbing power to a transparent protective film may be a method of incorporating an ultraviolet absorbent into the transparent protective film, or a method of laminating a surface treatment layer containing an ultraviolet absorbent onto a surface of the transparent protective film.

Specific examples of the ultraviolet absorbent include oxybenzophenone-based compounds, benzotriazole-based compounds, salicylate-based compounds, benzophenone-based compounds, cyanoacrylate-based compounds, nickel complex salt type compounds, and triazine-based compounds, which are known in the prior art.

After the polarizer and the transparent protective film are bonded to each other, the active energy ray curable resin composition is irradiated with an active energy ray (such as an electron beam, a ultraviolet ray or a visible ray) to be cured to form an adhesive layer. A direction along which the active energy ray (which is, for example, an electron beam, an ultraviolet ray or a visible ray) is radiated may be any appropriate radiating direction. Preferably, the active energy ray is radiated from the transparent protective film side of the adherent body. If the active energy ray is radiated from the polarizer side thereof, the polarizer may be unfavorably deteriorated by the active energy ray (which is, for example, an electron beam, an ultraviolet ray or a visible ray).

When the polarizing film according to the present invention is produced in a continuous line, the line speed, which depends on the curing period of the curable resin composition, is preferably from 1 to 500 m/min., more preferably from 5 to 300 m/min., even more preferably from 10 to 100 m/min. If the line speed is too small, the producing system is small in producing performance, or the transparent protective film is excessively damaged, so that no polarizing film that can endure an endurance test or the like can be produced. If the line speed is too large, the adhesive composition is insufficiently cured so that the curable resin composition may not gain a target adhesion.

In the polarizing film of the present invention, preferably, a polarizer and a transparent protective film are bonded to each other to interpose, therebetween, an adhesive layer constituted by a cured product layer of the above-defined active energy ray curable resin composition. Between the transparent protective film and the adhesive layer, an easily adhesive layer may be disposed. The easily adhesive layer can be formed, using a resin that may be of various types. This resin has, for example, a polyester, polyether, polycarbonate, polyurethane, silicone type, polyamide, polyimide or polyvinyl alcohol skeleton. These polymeric resins may be used singly or in any combination of two or more thereof. In the formation of the easily adhesive layer, a different additive may be added thereto. Specifically, for example, the following may be used: a tackifier, an ultraviolet absorbent, an antioxidant, and stabilizers such as a heat-resisting stabilizer.

The easily adhesive layer is usually laid on the transparent protective film in advance, and the easily adhesive layer side of the transparent protective film and the polarizer are bonded to each other through the adhesive layer. The formation of the easily adhesive layer is attained by painting a material for forming the easily adhesive layer onto the transparent protective film, and then drying the resultant according to a known technique. The material for forming the easily adhesive layer is usually prepared in the form of a solution in which the concentration of the material is diluted into an appropriate concentration, considering the thickness of the material-dried layer, the smoothness of the painting, and others. The thickness of the dried easily adhesive layer is preferably from 0.01 to 5 μm, more preferably from 0.02 to 2 μm, even more preferably from 0.05 to 1 μm. Plural easily adhesive layers may be laid. In this case also, however, the total thickness of the easily adhesive layers is set preferably into any one of these ranges.

<Polarizer>

The polarizer is not particularly limited, and may be of various types. The polarizer is, for example, a polarizer yielded by causing a dichroic material such as iodine or dichroic dye to be adsorbed into a hydrophilic polymeric film, such as a polyvinyl alcohol-based film, a partially-formal-converted polyvinyl alcohol-based film or an ethylene/vinyl acetate copolymer-based partially saponified film, and then drawing the resultant uniaxially; or a polyene aligned film made of, for example, a polyvinyl alcohol dehydrated product or a polyvinyl de-hydrochloride-treated product. Out of such polarizers, preferred is a polarizer composed of a polyvinyl alcohol-based film and a dichroic substance such as iodine. The thickness of such a polarizer is preferably from 2 to 30 μm, more preferably for 4 to 20 μm, most preferably from 5 to 15 μm. If the thickness of the polarizer is small, the polarizer is unfavorably lowered in optical endurance. If the thickness of the polarizer is large, the polarizer becomes large in dimension change at a high temperature and high humidity, so that inconveniences such as display unevenness are unfavorably generated.

The polarizer in which a polyvinyl alcohol-based film dyed with iodine has uniaxially drawn can be produced, for example, by immersing a polyvinyl alcohol into an aqueous solution of iodine to be dyed, and then drawing the resultant film into a length 3 to 7 times the original length of this film. As required, the drawn film may be immersed into an aqueous solution of, for example, boric acid or potassium iodide. Furthermore, before the dyeing, the polyvinyl alcohol-based film may be immersed into water as required to be cleaned with water. The cleaning of the polyvinyl alcohol-based film with water allows to clean stains and a blocking-preventing agent on surfaces of the polyvinyl alcohol-based film, and further produces an advantageous effect of swelling the polyvinyl alcohol-based film to prevent unevenness of the dyeing, and other unevennesses. The drawing may be performed after the dyeing with iodine or while the dyeing is performed. Alternatively, after the drawing, the dyeing with iodine may be performed. The drawing may be performed in an aqueous solution of, for example, boric acid or potassium iodide, or in a water bath.

When a thin polarizer having a thickness of 10 µm or less is used as the polarizer, the active energy ray curable resin composition used in the present invention can remarkably produce the advantageous effect thereof (that the resultant layer satisfies optical endurance in a severe environment at a high temperature and high humidity). The polarizer, the thickness of which is 10 µm or less, is more largely affected by water than any polarizer having a thickness more than 10 µm. Consequently, the former is insufficient in optical endurance in an environment at a high temperature and high humidity to be easily raised in transmittance or lowered in polarization degree. In other words, in the case of laminating the polarizer, the thickness of which is 10 µm or less, onto a transparent protective film to interpose, therebetween, an adhesive layer having a bulk water absorption of 10% or less by weight in the invention, the shift of water into the polarizer is restrained in a severely high temperature and high humidity environment. Consequently, the polarizing film can be remarkably restrained from undergoing deteriorations in optical endurances, such as a rise in transmittance and a lowering in polarization degree. The thickness of the polarizer is preferably from 1 to 7 µm from the viewpoint of making the polarizing film thinner. Such a thin polarizer is small in thickness unevenness, excellent in perceptibility, and small in dimension change. Furthermore, favorably, this thin polarizer also makes the polarizing film small in thickness.

Typical examples of the thin polarizer include thin polarizing membranes described in JP-A-S51-069644, JP-A-2000-338329, WO 2010/100917 pamphlet, and specifications of PCT/JP2010/001460 and Japanese Patent Applications No. 2010-269002 and No. 2010-263692. These thin polarizing membranes can each be yielded by a producing method including the step of drawing a polyvinyl alcohol-based resin (hereinafter referred to also as a PVA-based resin) and a resin substrate for drawing in a laminate state, and the step of dyeing the laminate. This producing method allows to draw the laminate, even when the PVA-based resin layer is thin, without causing inconveniences, such as breaking by the drawing, on the basis of the supporting of the PVA-based resin layer on the resin substrate for drawing.

The thin polarizing membranes are preferably polarizing membranes each yielded by the following producing method, out of producing methods including the step of drawing the members concerned in a laminate state thereof and the step of dyeing the laminate, since the laminate can be drawn into a high draw ratio to improve the resultant in polarizing performance: a producing method including the step of drawing the laminate in an aqueous solution of boric acid, as is described in the WO 2010/100917 pamphlet, or the PCT/JP 2010/001460 or Japanese Patent Application No. 2010-269002 or 2010-263692 specification. The membranes are in particular preferably membranes each yielded by a producing method including the step of drawing the laminate supplementally in the air before the drawing in the aqueous solution of boric acid, as is described in the Japanese Patent Application No. 2010-269002 or 2010-263692 specification.

<Transparent Protective Film>

The transparent protective film is preferably a film excellent in transparency, mechanical strength, thermal stability, water blocking performance, isotropy and others. Examples of a material therefor include polyester-based polymers, such as polyethylene terephthalate and polyethylene naphthalate, cellulose-based polymers such as diacetylcellulose and triacetylcellulose, acrylic polymers such as polymethyl methacrylate, styrene-based polymers such as polystyrene and acrylonitrile/styrene copolymer (AS resin), and polycarbonate-based polymers. Other examples of the polymer of which the transparent protective film is made include polyethylene, polypropylene, polyolefins each having a cyclic or norbornene structure, ethylene/propylene copolymer and other polyolefin polymers, vinyl chloride polymers, amide-based polymers such as nylon and aromatic polyamide, imide-based polymers, sulfone-based polymers, polyethersulfone-based polymers, polyetheretherketone-based polymers, polyphenylene sulfide-based polymers, vinyl alcohol-based polymers, vinylidene chloride-based polymers, vinyl butyral-based polymers, arylate polymers, polyoxymethylene polymers, and epoxy polymers; and any blend composed of two or more of these polymers. The transparent protective film may contain one or more appropriate additives selected at will. Examples of the additive(s) include an ultraviolet absorbent, an antioxidant, a lubricant, a plasticizer, a release agent, a coloring preventive, a flame retardant, a nucleating agent, an antistatic agent, a pigment and a colorant. The content of the above-mentioned thermoplastic resins in the transparent protective film is preferably from 50 to 100%, more preferably from 50 to 99%, even more preferably from 60 to 98%, in particular preferably from 70 to 97% by weight. If the content of the thermoplastic resins in the transparent protective film is 50% or less by weight, it is feared that the transparent protective film cannot sufficiently express high transparency and other properties which the thermoplastic resins originally have.

The transparent protective film may be a polymer film described in JP-A-2001-343529 (WO 01/37007), for example, a resin composition including a thermoplastic resin (A) having at a side chain thereof a substituted imide group and/or an unsubstituted imide group and a thermoplastic resin having at a side chain thereof a substituted phenyl and/or unsubstituted phenyl, and a nitrile group. A specific example thereof is a film of a resin composition including an alternating copolymer made from isobutylene and N-methylmaleimide, and acrylonitrile/styrene copolymer. The film may be a film made of a blend extruded product of the resin composition. Such a film is small in retardation, and small in photoelastic coefficient; thus, this film can solve inconveniences, such as an unevenness of the polarizing film that is-based on strains in the polarizing film and Si further small in water-vapor permeability to be excellent in humidity endurance.

In the polarizing film, the transparent protective film preferably has a water-vapor permeability of 150 g/m²/24-hours or less. This structure makes it difficult that water in the air enters the inside of the polarizing film, so that the water content by percentage in the polarizing film itself can be restrained from being changed. As a result, the polarizing film can be restrained from being curled or changed in dimension in accordance with a storage environment of the film.

The transparent protective film laid over one surface or each of two surfaces of the polarizer is preferably a film excellent in transparency, mechanical strength, thermal stability, water blocking performance, isotropy and others; and is more preferably a film the water-vapor permeability of which is particularly 150 g/m²/24-hours or less, in particular preferably 120 g/m²/24-hours or less, more preferably from 5 to 70 g/m²/24-hours or less. The water-vapor permeability is gained by a method described in the item EXAMPLES in the document.

Examples of a material for forming the transparent protective film satisfying the above-mentioned low water-vapor permeability include polyester resins, such as polyethylene terephthalate and polyethylene naphthalate; polycarbonate resins; arylate-based resins; amide-based resins such as nylon and aromatic polyamide; polyolefin-based polymers such as polyethylene, polypropylene and ethylene/propylene copolymer, cyclic olefin resins having a cyclic or norbornene structure, and (meth)acrylic resins; and mixtures each made of two or more of these resins. Out of these resins, preferred are polycarbonate-based resins, cyclic polyolefin-based resins and (meth)acrylic resins, and particularly preferred are cyclic polyolefin resins and (meth)acrylic resins.

The thickness of the transparent protective film may be appropriately decided, and is generally from about 5 to 100 μm, in particular preferably from 10 to 60 μm, more preferably from 20 to 40 μm from the viewpoint of the strength, the handleability and other workabilities of the film, thin-layer properties of the film, and other factors.

The method for causing the polarizer and the protective film to adhere to each other may be a method using a roll laminator. The method for laminating the protective films, respectively, onto both surfaces of the polarizer is selected from a method of bonding the polarizer to one of the protective films, and then bonding the other protective film to the resultant, and a method of causing the two protective films to bond simultaneously to the polarizer. Air bubbles involved between the polarizer and the protective films, which are generated at the time of the bonding, can be remarkably decreased by adopting the former method, that is, the method of bonding the polarizer to one of the protective films, and then bonding the other protective film to the resultant. Thus, the former method is favorable.

The method for curing the curable resin composition may be appropriately selected in accordance with the curing form of the curable resin composition. When the curable resin composition is thermal curable, the composition can be cured by heating treatment. The means for the heating treatment may be a means known in the prior art, such as a hot-wind oven, or an IR oven. When the curable resin composition is active energy ray curable, the composition can be cured by radiating an active energy ray, such as an electron beam, an ultraviolet ray or a visible ray, thereto. When the curable resin composition has both thermal curability and active energy ray curability, a combination of two or more of these means or methods is adoptable. The curable resin composition according to the present invention is preferably active energy ray curable. The use of the active energy ray curable resin composition favorably makes the producibility of transparent protective films to be obtained excellent, and these films each make it possible to restrain the polarizer from being lowered in optical properties by heat. Furthermore, it is preferred that the curable resin composition of the present invention does not substantially contain any volatile solvent. When the composition does not substantially contain any volatile solvent, no heating treatment is required so that the above-mentioned producibility is made excellent, and further the polarizer can be favorably restrained from being lowered in optical properties by heat.

<Optical Film>

When put into practical use, the polarizing film of the present invention is usable in the form of an optical film in which the polarizing film is laminated onto another optical layer. The optical layer is not particularly limited. Examples of the optical layer include a reflector, a transreflector, retardation plates (for example, a wavelength plates such as a half wavelength plate and a quarter wavelength plate), and a viewing angle compensation film, and other layers usable to form a liquid crystal display device, or the like. These layers may be used singly or in the form of two or more layers thereof. The polarizing film of the present invention is in particular preferably a reflection type polarizing film in which a reflector or a transreflector is further laminated on the polarizing film of the invention, an elliptically or circularly polarizing film in which a retardation plate is further laminated on the polarizing film, a wide viewing angle polarizing film in which a viewing angle compensation film is further laminated on the polarizing film, or a polarizing film in which a brightness enhancement film is further laminated on the polarizing film.

An optical film in which the optical layers are laminated onto the polarizing film may be formed in such a manner that the layers are successively and individually laminated onto each other in a process for producing, for example, a liquid crystal display device. An optical film prepared by laminating the layers beforehand onto each other is excellent in quality stability, fabricating workability and others to have an advantage of improving a process for producing, for example, liquid crystal display devices. For the laminating, a pressure-sensitive adhesive layer or any other appropriate adhesive means may be used. In the bonding of the polarizing film or the other optical film(s), its or their optical axis may be adjusted to have an appropriate location angle in accordance with, for example, a target retardation property.

In the above-defined polarizing film, or an optical film in which the polarizing film or such polarizing films are laminated onto a member, a pressure-sensitive adhesive layer may be laid for bonding this polarizing film or optical film onto a different member such as a liquid crystal cell. A pressure-sensitive adhesive agent that forms the pressure-sensitive adhesive layer is not particularly limited. This agent may be appropriately selected from the following, and then used: pressure-sensitive adhesive agents each containing, as a base polymer thereof, an acrylic polymer, silicone-based polymer, polyester, polyurethane, polyamide, polyether, fluorine-containing polymer, rubbery polymer, or some other polymer. The pressure-sensitive adhesive agent is in particular preferably an acrylic pressure-sensitive adhesive, or any other pressure-sensitive adhesive that is excellent in optical transparency, and shows pressure-sensitiveadhesive property of appropriate wettability, cohesive property and adhesion to be excellent in weather resistance, heat resistance and others.

Pressure-sensitive adhesive layers may be laid, as superimposed layers different from each other in, for example, composition or species, onto a single surface or each surface of the polarizing film or the optical film. When pressure-sensitive adhesive layers are laid, respectively, onto both surfaces of the polarizing film or optical film, these layers may be different from each other in, for example, composition, species or thickness on the front and rear side of the film. The thickness of (each of) the pressure-sensitive adhesive layer(s) may be appropriately decided in accordance with, for example, the use purpose and adhering strength thereof. The thickness is generally from 1 to 500 μm, preferably from 1 to 200 μm, in particular preferably from 1 to 100 μm.

A separator is temporarily bonded to a naked surface of the pressure-sensitive adhesive layer to cover the surface in order to attain the prevention of the pollution of the surface, and other purposes until the polarizing film is put into practical use. This coverage allows to prevent an object or a person from contacting the pressure-sensitive adhesive layer in the state that the polarizing film is ordinarily handled. The separator may be an appropriate separator according to conventional techniques except the above-mentioned thickness conditions. The separator may be an appropriate flat piece yielded according to the prior art, such as a plastic film, a rubber sheet, a paper, cloth or nonwoven cloth piece, a net, a foamed sheet or a metal foil piece; a laminated body of such flat pieces; or a product in which such a flat piece is optionally subjected to coating treatment with an appropriate release agent, such as a silicone type, long-chain alkyl type or fluorine-containing type agent, or molybdenum sulfide.

<Image Display Device>

The polarizing film or optical film of the present invention is preferably usable to form various devices such as a liquid crystal display device. The formation of the liquid crystal display device may be attained in accordance with the prior art. In other words, any liquid crystal display device is generally formed, for example, by fabricating appropriately a liquid crystal cell, and a polarizing film or optical film, together with an optional lighting system and other optional constituent parts, and then integrating a driving circuit into the resultant. In the present invention, a method for forming a liquid crystal display device is not particularly limited as far as the polarizing film or optical film according to the invention is used. Thus, the method is substantially according to the prior art. The liquid crystal cell may be also of any type, such as a TN type, STN type or π type.

An appropriate liquid crystal display device may be formed, examples thereof including a liquid crystal display device in which a polarizing film or optical film is arranged onto a single side or each of two sides of a liquid crystal cell, and a liquid crystal display device in which a backlight or reflector is used as a lighting system. In this case, any polarizing film or optical film according to the present invention can be set on the single side or each of the two sides of the liquid crystal cell. When polarizing films or optical films of the invention are set up, respectively, on the two sides, these may be the same as or different from each other. When the liquid crystal display device is formed, one or more appropriate components may be further arranged in the form of one or more layers at one or more appropriate positions of the device, examples of these component(s) including a diffusion plate, an anti-glare layer, an anti-reflection film, a protective plate, a prism array, a lens array sheet, a light diffusion plate, and a backlight.

Examples

Hereinafter, working examples of the present invention will be described. However, embodiments of the invention are not limited thereto.

<Production of Polarizers>

A 45-μm-thickness film of a polyvinyl alcohol having an average polymerization degree of 2400 and a saponification degree of 99.9% by mol was immersed in hot water of 30° C. temperature for 60 seconds to be swollen. Next, the film was immersed in an aqueous solution of iodine and potassium iodide (ratio by weight=0.5/8), the concentration thereof being 0.3%, and the film was dyed while drawn into a length 3.5 times the original length. Thereafter, the film was drawn in an aqueous solution of boric acid of 65° C. temperature to give a total draw ratio of 6. After the drawing, the film was dried in an oven of 40° C. temperature for 3 minutes. In this way, each polyvinyl alcohol-based polarizer (thickness: 18 μm) was yielded.

<Transparent Protective Films>

Protective film A: A biaxial kneader was used to mix 100 parts by weight of an imidated MS resin described in Production Example 1 in JP-A-2010-284840 with 0.62 part by weight of a triazine-based ultraviolet absorbent (trade name: T-712, manufactured by Adeka Corp.) at 220° C. to produce resin pellets. The resultant resin pellets were dried at 100.5 kPa and 100° C. for 12 hours, and a uniaxial extruder was then used to extrude the pellets through a T die at a dice temperature of 270° C. to be shaped into the form of a film (thickness: 160 μm). Furthermore, this film was drawn into the transporting direction thereof in an atmosphere of 150° C. temperature (thickness: 80 μm). Next, an easily bondable adhesive containing an aqueous urethane resin was painted onto the film, and then drawn into a direction orthogonal to the film-transporting direction in an atmosphere of 150° C. temperature to yield a first transparent protective film of 40 μm thickness (water-vapor permeability: 58 g/m$^2$/24-hours).

Protective film B: the following was used: a 60-μm-thickness triacetylcellulose film (FUJITACK TG60UL, manufactured by Fuji Film Corp.; water-vapor permeability: 608 g/m$^2$/24-hours).

<Water-Vapor Permeability of Transparent Protective Films>

The water-vapor permeability of a sample of each of the above-mentioned transparent protective film species was measured in accordance with a water-vapor permeability test (cup test) of JIS 20208. The sample, which had been cut into a piece having a diameter of 60 mm, was set into a water-vapor permeable cup in which about 15 g of calcium chloride was put. This system was put into a thermostat having a temperature of 40° C. and a humidity of 90% R.H., and then allowed to standstill for 24 hours. Before and after the still-standing, an increase of the calcium chloride in weight was measured to gain the water-vapor permeability (g/m$^2$/24-hours) of the sample.

<Bulk Water Absorption Coefficient>

A curable adhesive, for polarizing film, used in each of the examples was used, and sandwiched between two glass pieces to each of which a space of 100 μm thickness was attached. Under the same conditions as in the working examples, the adhesive was cured under the same energy conditions as in the working examples to prepare an adhesive layer (cured product) of 100 μm thickness. This sample was used as a sample. The weight of the sample was a weight (M1) g. The sample M1 g was immersed in pure water of 23° C. temperature for 24 hours. Thereafter, the sample was taken out from pure water, and wiped with a dry cloth piece. Thereafter, within one minute, the weight (M2) g of the sample was measured. From these results, the bulk absorption coefficient of the sample was calculated out in accordance with the following expression:

$$\{(M2-M1)/M1\}\times 100(\%).$$

<Active Energy Rays>

As active energy rays, visible rays (gallium sealed metal halide lamp) were used. Radiating device: Light HAMMER 10, manufactured by Fusion UV Systems, Inc. Valve: V valve. Peak irradiance: 1600 mW/cm$^2$. Integrated radiated-light quantity: 1000/mJ/cm$^2$ (wavelengths: 380 to 440 nm). The irradiance of the visible rays was measured, using a Sola-Check system manufactured by Solatell Ltd.

Examples 1 to 6, and Comparative Examples 1 to 2

(Preparation of Curable Resin Compositions)

In each of these examples, in accordance with a blend table described in Table 1, individual components were blended with each other, and the resultant mixture was stirred for 1 hour to yield an active energy ray curable resin composition, which was according to one of Examples 1 to 6, and Comparative Examples 1 to 2.

(Production of Polarizing Films)

The active energy ray curable adhesive according to each of Examples 1 to 6, and Comparative Examples 1 and 2 was painted into a thickness of 0.7 μm onto a bonding surface of each of the first and the second transparent protective films, using an MCD coater (manufactured by Fuji Machinery Co., Ltd.) (cell shape: honeycomb shape: the number of gravure roll lines: 1000/inch; rotary speed: 140% of the line speed). A roll machine was used to cause the transparent protective films to bond, respectively, to both surfaces of one of the above-mentioned polarizers X. In Table 1 are shown transparent protective film species used, respectively, as the first and the second transparent protective films. Thereafter, an active energy ray radiating machine was used to radiate the above-mentioned visible rays onto both surfaces of the workpiece from the bonded-transparent-protective-film sides (both sides) of the workpiece. In this way, the active energy ray curable adhesive according to each of Example 1 and Comparative Example 1 was cured, and then the resultant was dried by hot wind of 70° C. temperature for 3 minutes to yield each polarizing film having the transparent protective films, respectively, on both sides of the polarizer. The line speed for the bonding was 25 m/min.

Evaluations described below were made about the polarizing films yielded in each of the working examples and the comparative examples. The results are shown in Table 1.

<Peel Strength>

One of the polarizing films was cut into two pieces each having a size of 200 mm in a direction parallel with the drawing direction of the polarizer and 15 mm in a direction orthogonal thereto. The polarizing films were each bonded onto a glass plate. A utility knife was used, about each of the films, to make a cut into between the transparent protective film (acrylic resin or TAC) and the polarizer. A Tensilon was used to peel off the protective film and the polarizer from each other into a 90-degree direction at a peel rate of 300 m/min. The peel strength (N/15-mm) therebetween was measured.

<Humidifying Endurance Test>

One of the polarizing films was cut into two pieces each having a size of 200 mm in a direction parallel with the drawing direction of the polarizer and 15 mm in a direction orthogonal thereto. The polarizing films were each immersed in hot water of 60° C. temperature for 8 hours, and then taken out. Within 30 minutes, the polarizing films were each bonded (in a non-dry state) to a glass plate. A utility knife was used, about each of the films, to make a cut into between the transparent protective film (acrylic resin or TAC) and the polarizer. A Tensilon was used to peel off the protective film and the polarizer from each other into a 90-degree direction at a peel rate of 300 m/min. The peel strength (N/15-mm) therebetween was measured.

TABLE 1

| | | | Example 1 | Example 2 | Example 3 | Example 4 |
|---|---|---|---|---|---|---|
| Adhesive composition blend ratio | General formula (1) compounds | 3-Acrylamidephenylboronic acid | 1 | | 1 | 1 |
| | | Vinylphenylboronic acid | 0 | 1 | 0 | 0 |
| | Organometallic compounds | ORGATIX TA-30 | 1 | 1 | 0 | 0 |
| | | ORGATIX TC 100 | 0 | 0 | 1 | 0 |
| | | ORGATIX TC-800 | 0 | 0 | 0 | 1 |
| | Other compounds | Hydroxyethylacrylamide | 10 | 10 | 10 | 10 |
| | | Acryloylmorpholine | 30 | 30 | 30 | 30 |
| | | 1,9-Nonanediol diacrylate | 53 | 53 | 53 | 53 |
| | Polymerization initiator | IRGACURE 907 | 3 | 3 | 3 | 3 |
| | | KAYACURE DETX-S | 2 | 2 | 2 | 2 |
| Adhesive composition properties | Viscosity [mPa/s] | | 15 | 15 | 15 | 15 |
| | Composition external appearance | | Transparent | Transparent | Transparent | Transparent |
| Cured product of adhesive composition | Bulk water absorption coefficient [% by weight] | | 5.3 | 5.2 | 5.3 | 5.5 |
| Polarizing film | First protective film | | Transparent protective film A | Transparent protective film A | Transparent protective film A | Transparent protective film A |
| | Second protective film | | Transparent protective film A | Transparent protective film A | Transparent protective film A | Transparent protective film A |

TABLE 1-continued

| Evaluations | Peel strength [N/15 mm] | First protective film | 4.5 | 4.3 | 4.3 | 4.5 |
| --- | --- | --- | --- | --- | --- | --- |
| | | Second protective film | 4.1 | 4 | 4.2 | 4 |
| | Humidifying endurance test [N/15 mm] | First protective film | 3.8 | 3.7 | 3.5 | 3.6 |
| | | Second protective film | 3.1 | 3.3 | 3.4 | 3.6 |

| | | | Example 5 | Example 6 | Comparative Example 1 | Comparative Example 2 |
| --- | --- | --- | --- | --- | --- | --- |
| Adhesive composition blend ratio | General formula (1) compounds | 3-Acrylamidephenylboronic acid | 1 | 1 | 2 | 0 |
| | | Vinylphenylboronic acid | 0 | 0 | 0 | 0 |
| | Organometallic compounds | ORGATIX TA-30 | 1 | 1 | 0 | 3 |
| | | ORGATIX TC 100 | 0 | 0 | 0 | 0 |
| | | ORGATIX TC-800 | 0 | 0 | 0 | 0 |
| | Other compounds | Hydroxyethylacrylamide | 20 | 10 | 10 | 10 |
| | | Acryloylmorpholine | 33 | 30 | 30 | 30 |
| | | 1,9-Nonanediol diacrylate | 40 | 53 | 54 | 55 |
| | Polymerization initiator | IRGACURE 907 | 3 | 3 | 3 | 3 |
| | | KAYACURE DETX-S | 2 | 2 | 2 | 2 |
| Adhesive composition properties | Viscosity [mPa/s] | | 39 | 15 | 18 | 14 |
| | Composition external appearance | | Transparent | Transparent | Unsolved-composition residue | Transparent |
| Cured product of adhesive composition | Bulk water absorption coefficient [% by weight] | | 12.8 | 5.3 | 5.1 | 5.5 |
| Polarizing film | First protective film | | Transparent protective film A | Transparent protective film B | Transparent protective film A | Transparent protective film A |
| | Second protective film | | Transparent protective film A | Transparent protective film B | Transparent protective film A | Transparent protective film A |
| Evaluations | Peel strength [N/15 mm] | First protective film | 4.3 | 4.5 | 4.2 | 3.3 |
| | | Second protective film | 3.9 | 4.5 | 4 | 2.8 |
| | Humidifying endurance test [N/15 mm] | First protective film | 2.7 | 2.5 | 1.7 | 0.2 |
| | | Second protective film | 2.5 | 1.9 | 1.5 | 0.2 |

In Table 1, components are as follows:

A compound represented by the general formula (1): 3-acrylamidephenylboronic acid (manufactured by Junsei Chemical Co., Ltd.)

A compound represented by the general formula (1): vinylphenylboronic acid (manufactured by Junsei Chemical Co., Ltd.)

Ametalalkoxide: ORGATIX TA-30: tetraoctyltitanate (its organic group having 8 carbon atoms), manufactured by Matsumoto Fine Chemical Co. Ltd.;

A metal chelate: ORGATIX TC-100: titanium acetylacetonate (its organic group having 5 carbon atoms), manufactured by Matsumoto Fine Chemical Co. Ltd.;

A metal chelate: ORGATIX TC-800: titanium isostearate (its organic group having 18 carbon atoms), manufactured by Matsumoto Fine Chemical Co. Ltd.;

Hydroxyethylacrylamide ("HEAA" manufactured by Kohjin Co. Ltd.);

Acryloylmorpholine ("ACMO", manufactured by Kohjin Co. Ltd.);

1,9-Nonanediol diacrylate ("LIGHT ACRYLATE", manufactured by Kyoeisha Chemical Co., Ltd.); and Polymerization initiators:

IRGACURE 907 (manufactured by the company BASF), and

KAYACURE DETX-S (manufactured by Nippon Kayaku Co., Ltd.).

The invention claimed is:

1. A curable resin composition, comprising:
a compound represented by the following general formula (1):

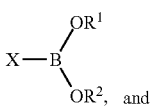

(1)

at least organometallic compound selected from the group consisting of a metal alkoxide and a metal chelate, wherein X is a functional group comprising a reactive group, and wherein $R^1$ and $R^2$ each independently represent a hydrogen atom.

2. The curable resin composition according to claim 1, wherein the compound represented by the general formula (1) is a compound represented by the following general formula (1'):

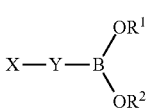

(1')

wherein Y is an organic group, and wherein X, $R^1$ and $R^2$ are the same as described above in claim 1.

3. The curable resin composition according to claim 1, further comprising an active energy ray curable component; and wherein the reactive group of X is at least one reactive group selected from the group consisting of vinyl, (meth)acryl, styryl, (meth)acrylamide, epoxy, oxetane, and mercapto groups.

4. The curable resin composition according to claim 1, wherein the organometallic compound comprises titanium.

5. The curable resin composition according to claim 1, wherein the organometallic compound is a metal alkoxide, the metal alkoxide comprising an organic group having six or more carbon atoms.

6. The curable resin composition according to claim 1, wherein the organometallic compound is a metal chelate, the metal chelate comprising an organic group having four or more carbon atoms.

7. The curable resin composition according to claim 1, wherein when a cured product yielded by curing the curable resin composition is immersed in pure water of 23° C. temperature for 24 hours, the cured product shows a bulk water absorption coefficient of 10% or less by weight, the bulk water absorption coefficient being represented by the following expression:

$$\{(M2-M1)/M1\} \times 100(\%)$$

wherein M1 is a weight of the cured product before the product is immersed, and wherein M2 is a weight of the cured product after the product is immersed.

8. The curable resin composition according to claim 1, wherein the cured product yielded by curing the curable resin composition has a storage modulus of $1.0 \times 10^7$ Pa or more at 25° C.

9. The curable resin composition according to claim 1, further comprising a compound represented by the following general formula (2):

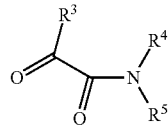

(2)

wherein $R^3$ is a hydrogen atom or a methyl group, wherein $R^4$ and $R^5$ are each independently a hydrogen atom, an alkyl group, a hydroxyalkyl group, an alkoxyalkyl group or a cyclic ether group, and wherein $R^4$ and $R^5$ may form a cyclic hetero-ring.

10. A polarizing film, comprising;
a polarizer, and
a cured resin layer positioned on or over at least one surface of the polarizer and yielded by curing a curable resin composition,
wherein the curable resin composition is a curable resin composition as recited in claim 1.

11. The polarizing film according to claim 10,
wherein the cured resin layer is an adhesive layer, and
wherein a transparent protective film is laid over at least one surface of the polarizer to interpose the adhesive layer between the polarizer and the transparent protective film.

12. The polarizing film according to claim 11, wherein the transparent protective film has a water-vapor permeability of 5 to 70 g/m².

13. An optical film, wherein at least one polarizing film as recited in claim 10 is laminated.

14. An image display device, comprising a polarizing film as recited in claim 10.

15. A production process for a polarizing film comprising a polarizer, and a cured resin layer positioned on or over at least one surface of the polarizer and yielded by curing a curable resin composition;
the curable resin composition being a composition comprising a compound represented by the following general formula (1):

at least organometallic compound selected from the group consisting of a metal alkoxide and a metal chelate;
wherein X is a functional group comprising a reactive group, and
wherein $R^1$ and $R^2$ each independently represent a hydrogen atom, the process comprising:
an applying step of applying the curable resin composition to at least one surface of the polarizer, and
a curing step of radiating an active energy ray to a resultant workpiece from a surface side of the workpiece on or over which the polarizer is present, or to a surface side thereof on or over which the curable resin composition is applied, to cure the curable resin composition.

16. An image display device, comprising an optical film as recited in claim 13.

* * * * *